US012666425B2

(12) United States Patent
Yeo et al.

(10) Patent No.: US 12,666,425 B2
(45) Date of Patent: Jun. 23, 2026

(54) METHOD AND APPARATUS FOR UPLINK TRANSMISSION AND RECEPTION METHOD IN WIRELESS COMMUNICATIONS SYSTEM

(71) Applicant: Samsung Electronics Co., Ltd.,
Suwon-si (KR)

(72) Inventors: Jeongho Yeo, Suwon-si (KR);
Hyunseok Ryu, Suwon-si (KR);
Sungjin Park, Suwon-si (KR);
Seunghoon Choi, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 444 days.

(21) Appl. No.: 17/562,468

(22) Filed: Dec. 27, 2021

(65) Prior Publication Data
US 2022/0210783 A1    Jun. 30, 2022

(30) Foreign Application Priority Data
Dec. 31, 2020    (KR) ......................... 10-2020-0189712

(51) Int. Cl.
H04W 4/06      (2009.01)
H04L 1/1812    (2023.01)
H04W 72/21     (2023.01)
H04L 12/18     (2006.01)

(52) U.S. Cl.
CPC ........... *H04W 72/21* (2023.01); *H04L 1/1812* (2013.01); *H04W 4/06* (2013.01); *H04L 12/189* (2013.01)

(58) Field of Classification Search
CPC ...... H04W 72/21; H04W 4/06; H04L 1/1812; H04L 12/189
See application file for complete search history.

(56) References Cited

U.S. PATENT DOCUMENTS

| | | |
|---|---|---|
| 10,966,228 B2 | 3/2021 | Park et al. |
| 11,838,132 B2 | 12/2023 | Yeo et al. |
| 12,389,422 B2 | 8/2025 | Kim et al. |
| 2016/0212731 A1 | 7/2016 | Zhang et al. |

(Continued)

FOREIGN PATENT DOCUMENTS

| | | |
|---|---|---|
| CN | 107210890 A | 9/2017 |
| CN | 110121914 A | 8/2019 |

(Continued)

OTHER PUBLICATIONS

Moderator (CMCC), "Summary#1 on mechanisms to support group scheduling for RRC_Connected UEs for NR MBS," R1-2008940, 3GPP TSG RAN WG1 #103-e, e-Meeting, Nov. 4, 2020.
CATT, "Discussion on reliability improvement mechanism for RRC_Connected UEs in MBS," R1-2007836, 3GPP TSG RAN WG1 #103-e, e-Meeting, Nov. 1, 2020.

(Continued)

*Primary Examiner* — Rafael Pérez-Gutiérrez
*Assistant Examiner* — Gilbert M Grant
(74) *Attorney, Agent, or Firm* — Jefferson IP Law, LLP

(57) ABSTRACT

A method of operating a terminal in a wireless communication system is provided. The method includes identifying an uplink bandwidth part (BWP) associated with multicast and broadcast services (MBS) configured for the terminal, determining resources for transmitting a physical uplink control channel (PUCCH) in the uplink BWP associated with the MBS, and transmitting the PUCCH to a base station by using the determined resources.

14 Claims, 15 Drawing Sheets

(56) References Cited

U.S. PATENT DOCUMENTS

| 2019/0037586 | A1 |  | 1/2019 | Park et al. |  |
|---|---|---|---|---|---|
| 2020/0351837 | A1 | * | 11/2020 | Hwang | H04L 5/0078 |
| 2021/0037500 | A1 | * | 2/2021 | Liu | H04W 72/23 |
| 2021/0091880 | A1 | * | 3/2021 | Kim | H04W 72/23 |
| 2021/0204248 | A1 | * | 7/2021 | Zhang | H04W 4/06 |
| 2023/0035066 | A1 | * | 2/2023 | Bae | H04W 72/1268 |
| 2023/0040690 | A1 | * | 2/2023 | Chen | H04L 5/0053 |
| 2023/0050307 | A1 | * | 2/2023 | Zhou | H04W 4/06 |
| 2023/0062724 | A1 | * | 3/2023 | Zhou | H04L 1/1864 |
| 2023/0137551 | A1 | * | 5/2023 | Wang | H04W 4/06 |
|  |  |  |  |  | 370/312 |
| 2024/0057088 | A1 | * | 2/2024 | Matsumura | H04L 1/1854 |

FOREIGN PATENT DOCUMENTS

| CN | 111771414 | A | 10/2020 |
|---|---|---|---|
| EP | 3 657 837 | A1 | 5/2020 |
| KR | 10-2020-0036693 | A | 4/2020 |
| WO | 2020/136027 | A1 | 7/2020 |
| WO | 2020/190195 | A1 | 9/2020 |

OTHER PUBLICATIONS

International Search Report dated Mar. 28, 2022, issued in International Application No. PCT/KR2021/019735.
Extended European Search Report dated May 31, 2024, issued in European Application No. 21915679.1-1206.
ZTE; Basic Functions for Broadcast/Multicast for RRC_Idle/Inactive UEs; 3GPP TSG RAN WG1 #103-e; R1-2008828; e-Meeting, Nov. 1, 2020.
Qualcomm Incorporated; View on group scheduling for Multicast RRC_Connected UEs; 3GPP TSG RAN WG1 #103-e; R1-2009274; e-Meeting, Nov. 1, 2020.
Koean Office Action dated Jun. 25, 2025, issued in a Korean Patent Application No. 10-2020-0189712.
FUTUREWEI; Improving reliability for MC/BC services; 3GPP TSG RAN WG1 #103-e; R1-2007557; e-Meeting; Oct. 26-Nov. 13, 2020.
Korean Office Action with English translation dated Jan. 13, 2026; Korean Application No. 10-2020-0189712.
Chinese Office Action dated Apr. 10, 2026, issued in a Chinese Patent Application No. 202180088760.0.
European Office Action dated Apr. 28, 2026, issued in a European Patent Application No. 21915679.1.

* cited by examiner

| SCS | Bandwidth |
|---------|-----------|
| 15 kHz | 3.6 MHz |
| 30 kHz | 7.2 MHz |
| 120 kHz | 28.8 MHz |
| 240N kHz | 57.6 MHz |

METHOD AND APPARATUS FOR UPLINK TRANSMISSION AND RECEPTION METHOD IN WIRELESS COMMUNICATIONS SYSTEM

CROSS-REFERENCE TO RELATED APPLICATION

This application is based on and claims priority under 35 U.S.C. § 119(a) of a Korean patent application number 10-2020-0189712, filed on Dec. 31, 2020, in the Korean Intellectual Property Office, the disclosure of which is incorporated by reference herein in its entirety.

BACKGROUND

1. Field

The disclosure relates to a wireless communication system More particularly, the disclosure relates to a method and apparatus for transmitting and receiving feedbacks in data communication for groupcast, multicast, or broadcast and a physical layer.

2. Description of the Related Art

In order to meet increasing demand with respect wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post long term evolution (post-LTE)' systems. In order to achieve high data rates, implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. In order to improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of Cloud-RAN as the above-described big data processing technology may be an example of convergence of 5G communication technology and IoT technology.

Also, a low-density parity-check (LDPC) code may be used to effectively transmit data in a new radio (NR) system. Furthermore, there are two methods of transmitting a parity bit generated by LDPC coding, and a full buffer rate matching (FBRM) method may involve transmitting all parity bits generated by LDPC coding and a limited buffer rate matching (LBRM) method may involve limiting the number of transmittable parity bits.

The above information is presented as background information only to assist with an understanding of the disclosure. No determination has been made, and no assertion is made, as to whether any of the above might be applicable as prior art with regard to the disclosure.

SUMMARY

A base station (BS) may provide groupcast, multicast, and broadcast services by transmitting same data to a plurality of user equipments (UE). Transmission of a feedback from a UE to the BS, the feedback being about groupcast/multicast data received by the UE, may help increasing performance of the data transmission. In order for the UE to transmit the feedback to the BS, a configuration of a frequency and a time resource for uplink (UL) feedback transmission may be required, and a configuration of a UL bandwidth part (BWP) for feedback transmission may be required. Aspects of the disclosure are to address at least the above-mentioned problems and/or disadvantages and to provide at least the advantages described below. Accordingly, an aspect of the disclosure is to provide a method and apparatus for configuring a resource and a BWP for transmitting a feedback about downlink (DL) data (physical downlink shared channel (PDSCH)) for groupcast/multicast/broadcast.

Additional aspects will be set forth in part in the description which follows and, in part, will be apparent from the description, or may be learned by practice of the presented embodiments.

In accordance with an aspect of the disclosure, a method of operating a terminal in a wireless communication system is provided. The method includes identifying an uplink bandwidth part (BWP) associated with multicast and broadcast services (MBS) configured for the terminal, determining resources for transmitting a physical uplink control channel (PUCCH) in the uplink BWP associated with the MBS, and transmitting the PUCCH to a base station by using the determined resources.

In accordance with another aspect of the disclosure, a terminal of a wireless communication system is provided. The terminal includes a transceiver, and at least one processor configured to identify an uplink bandwidth part (BWP) associated with multicast and broadcast services (MBS) configured for the terminal, determine resources for transmitting a physical uplink control channel (PUCCH) in the uplink BWP associated with the MBS, and transmit, via the transceiver, the PUCCH to a base station by using the determined resources.

In accordance with another aspect of the disclosure, a method of operating a terminal in a wireless communication system is provided. The method includes identifying an uplink bandwidth part (BWP) associated with multicast and broadcast services (MBS) configured for the terminal, determining resources for transmitting a physical uplink control channel (PUCCH) in the uplink BWP associated with the MBS, and transmitting the PUCCH to a base station by using the determined resources.

The method may further include receiving an indicator indicating whether the uplink BWP associated with MBS is configured for the terminal.

The determining of the resources for transmitting the PUCCH may include determining the resources for transmitting the PUCCH based on a bit field value of downlink control information (DCI).

The PUCCH may include hybrid automatic repeat request-acknowledgement (HARQ-ACK) information for downlink data commonly transmitted to a plurality of terminals, and the bit field value of the DCI may indicate whether the HARQ-ACK information includes only NACK, or ACK or NACK.

The PUCCH may include HARQ-ACK information for downlink data commonly transmitted to a plurality of terminals, and the determining of the resources for transmitting the PUCCH may include determining the resources for transmitting the PUCCH based on at least one of a frame number or a slot index in which the HARQ-ACK information is to be transmitted.

The PUCCH may include HARQ-ACK information for downlink data commonly transmitted to a plurality of terminals, and the determining of the resources for transmitting the PUCCH may include determining the resources for transmitting the PUCCH based on at least one of a frame number or a slot index in which the downlink data is transmitted.

The determining of the resources for transmitting the PUCCH may include determining the resources for transmitting the PUCCH based on at least one of an initial uplink BWP of the terminal, a currently activated uplink BWP of the terminal, or the uplink BWP associated with the MBS configured for the terminal.

The determining of the resources for transmitting the PUCCH may include determining the resources for transmitting the PUCCH based on an offset indicated by higher layer signaling.

The determining of the resources for transmitting the PUCCH may include determining the resources for transmitting the PUCCH based on an offset indicated by DCI which is commonly transmitted to a plurality of terminals including the terminal.

The determining of the resources for transmitting the PUCCH may include determining the resources for transmitting the PUCCH based on a group member index configured for the terminal.

In accordance with another aspect of the disclosure, a terminal of a wireless communication system is provided.

The terminal includes a transceiver, and at least one processor configured to identify an uplink bandwidth part (BWP) associated with multicast and broadcast services (MBS) configured for the terminal, determine resources for transmitting a physical uplink control channel (PUCCH) in the uplink BWP associated with the MBS, and transmit, via the transceiver, the PUCCH to a base station by using the determined resources.

The at least one processor may be further configured to receive, via the transceiver, an indicator indicating whether the uplink BWP associated with MBS is configured for the terminal.

The at least one processor may be further configured to determine the resources for transmitting the PUCCH based on a bit field value of downlink control information (DCI).

The PUCCH may include hybrid automatic repeat request-acknowledgement (HARQ-ACK) information for downlink data commonly transmitted to a plurality of terminals, and the bit field value of the DCI may indicate whether the HARQ-ACK information includes only NACK, or ACK or NACK.

The PUCCH may include HARQ-ACK information for downlink data commonly transmitted to a plurality of terminals, and the at least one processor may be configured to determine the resources for transmitting the PUCCH based on at least one of a frame number or a slot index in which the HARQ-ACK information is to be transmitted.

The PUCCH may include HARQ-ACK information for downlink data commonly transmitted to a plurality of terminals, and the at least one processor may be configured to determine the resources for transmitting the PUCCH based on at least one of a frame number or a slot index in which the downlink data is transmitted.

The at least one processor may be configured to determine the resources for transmitting the PUCCH based on at least one of an initial uplink BWP of the terminal, a currently activated uplink BWP of the terminal, or the uplink BWP associated with the MBS configured for the terminal The at least one processor may be configured to determine the resources for transmitting the PUCCH based on an offset indicated by higher layer signaling.

The at least one processor may be configured to determine the resources for transmitting the PUCCH based on an offset indicated by DCI which is commonly transmitted to a plurality of terminals including the terminal.

The at least one processor may be configured to determine the resources for transmitting the PUCCH based on a group member index configured for the terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Figure 3:
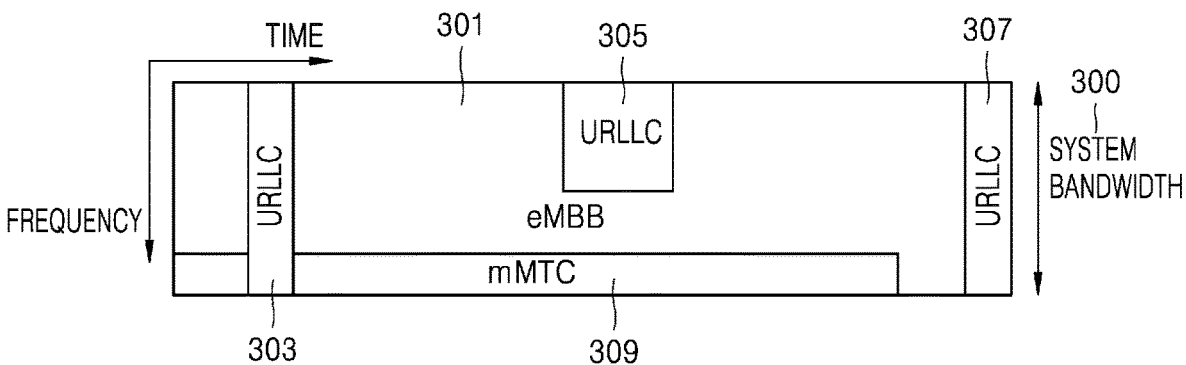
Figure 4:
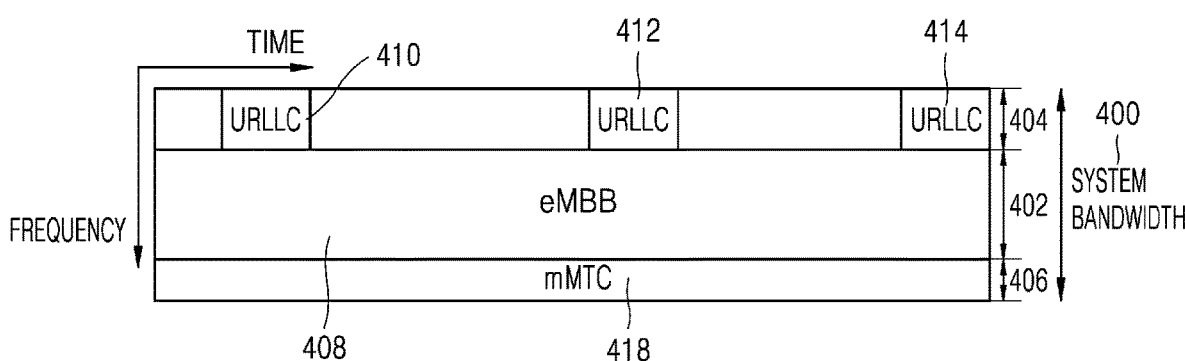
Figure 5:
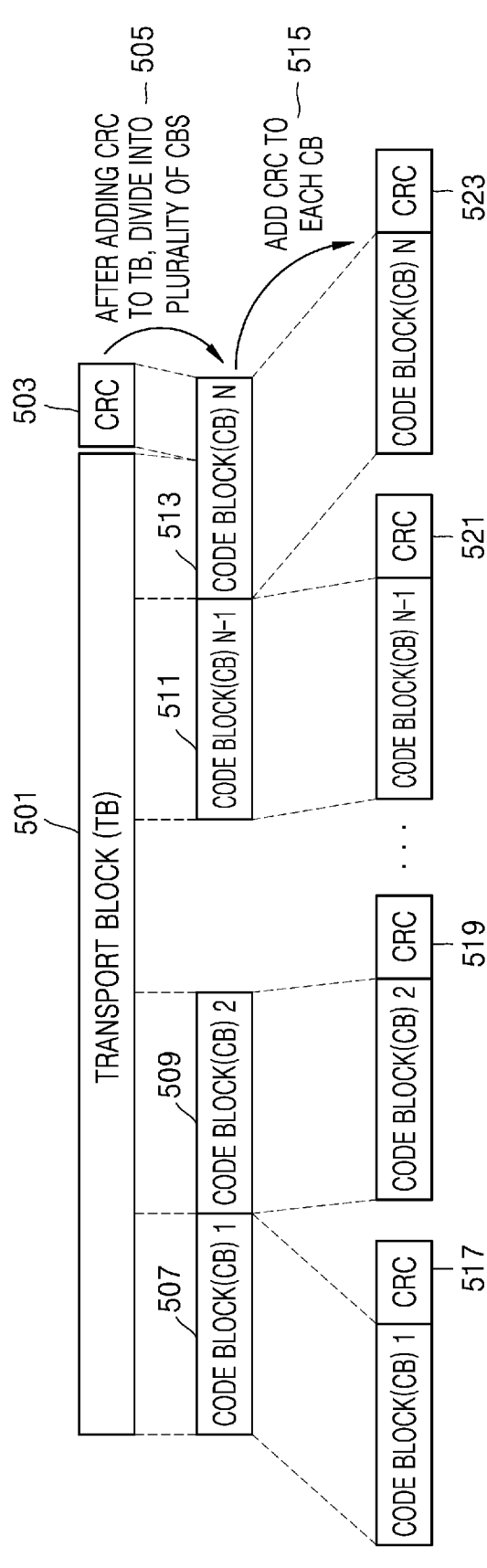
Figure 6:
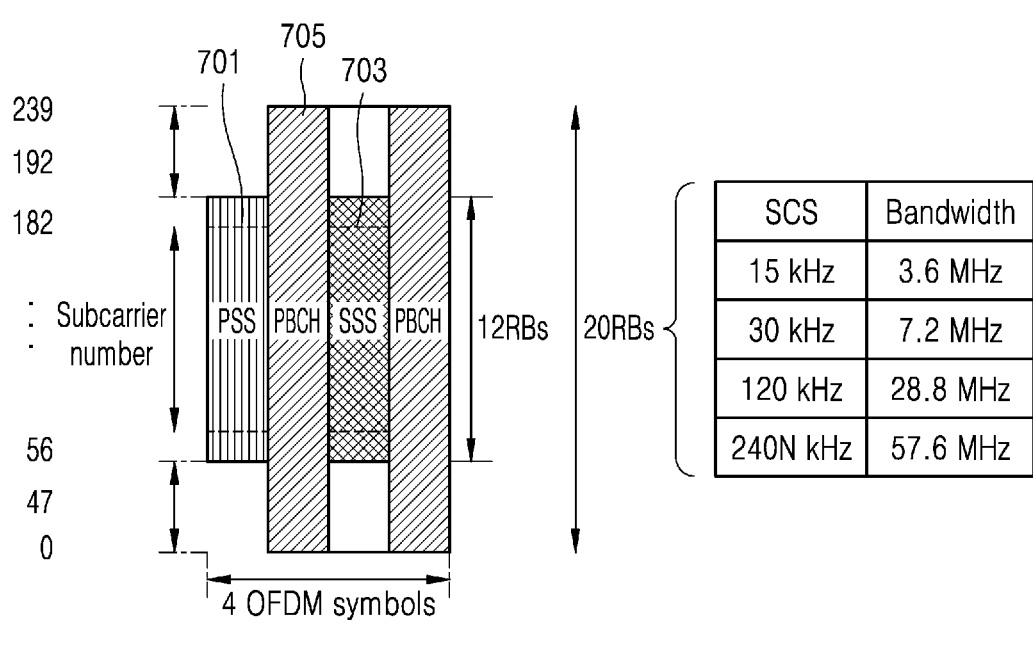
Figure 6:
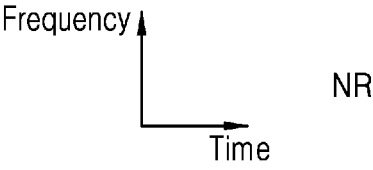
Figure 8:
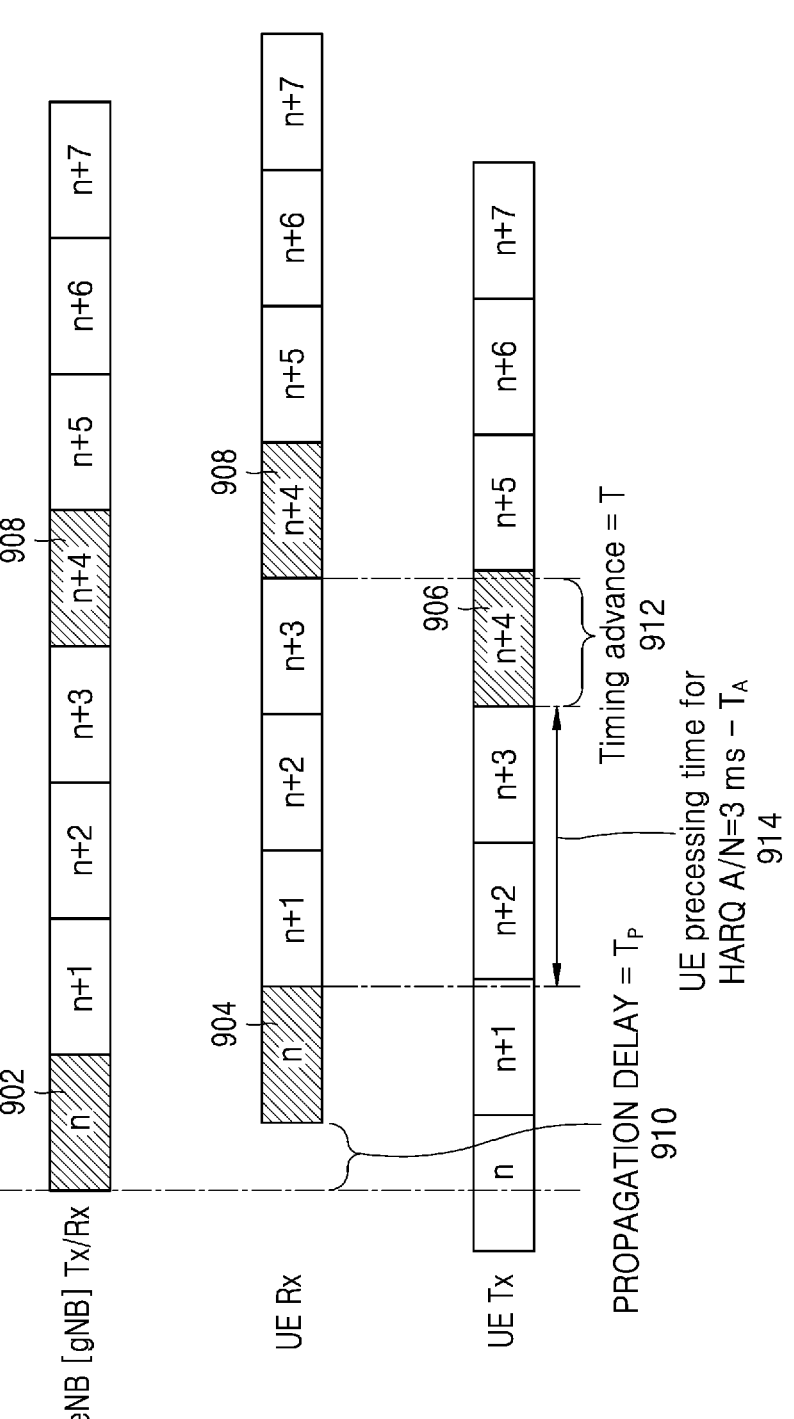
Figure 9:
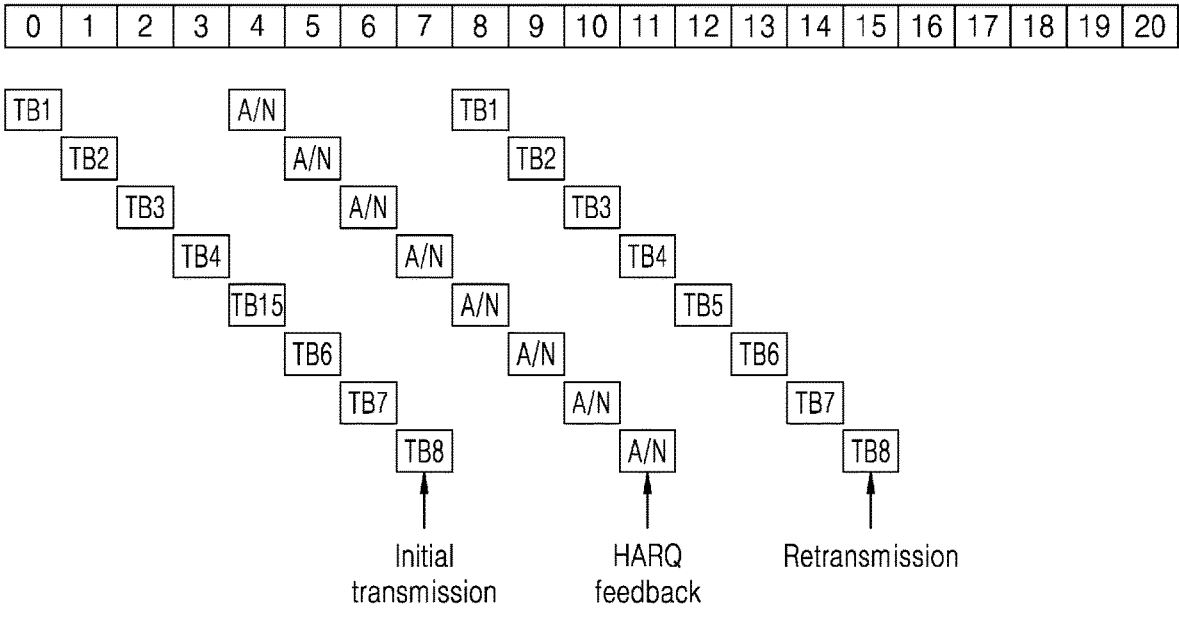
Figure 10:
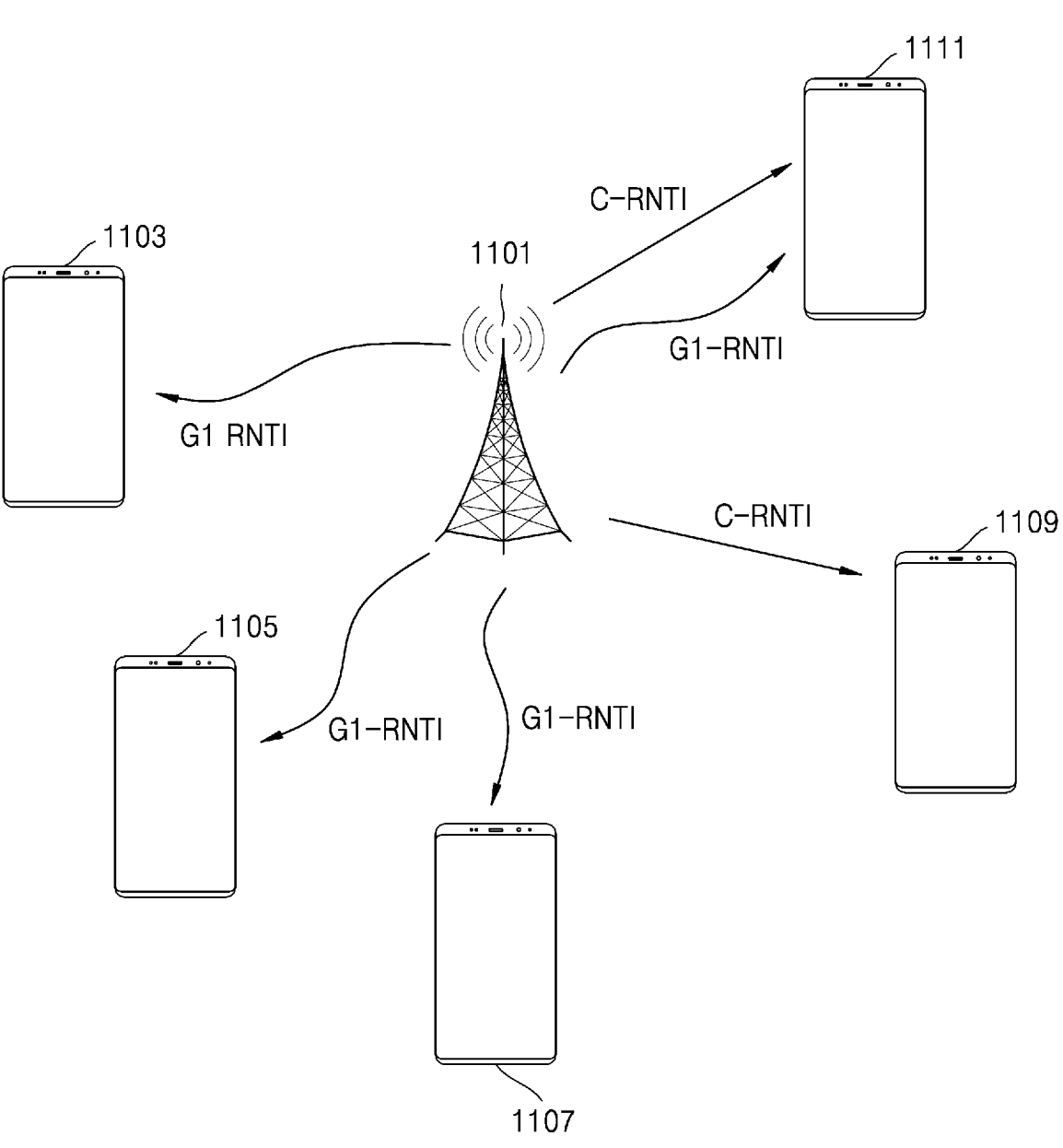
Figure 11:
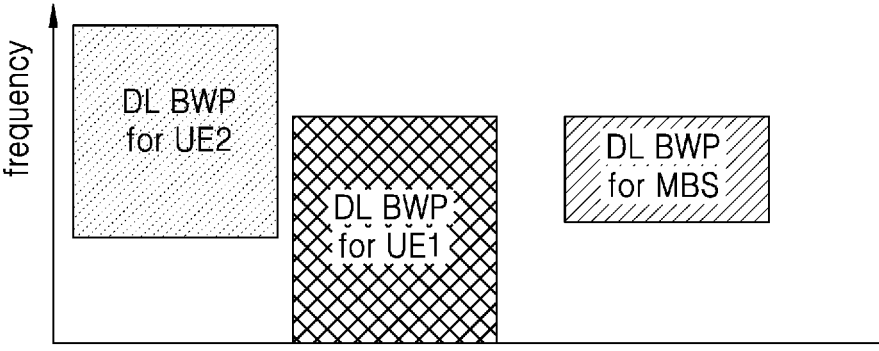
Figure 11:
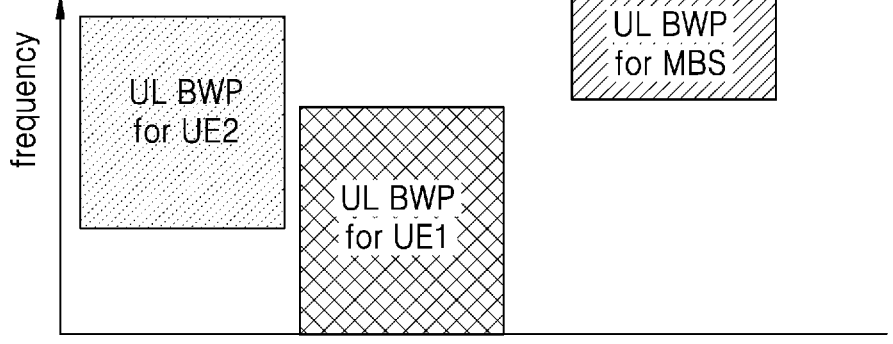
Figure 12:
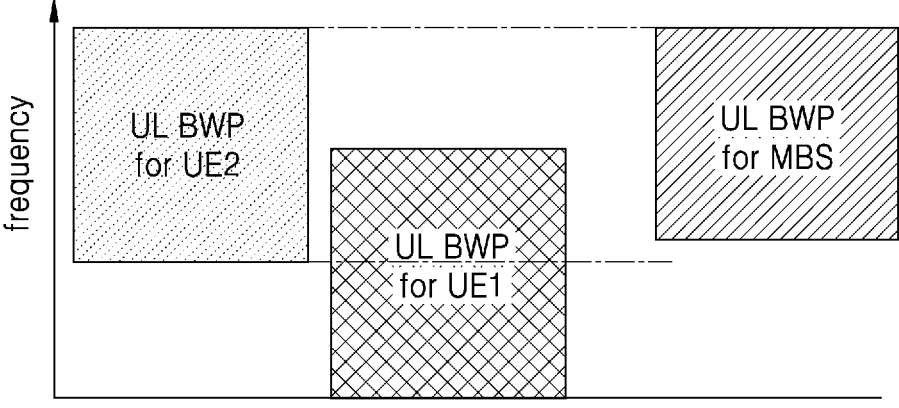
Figure 13:
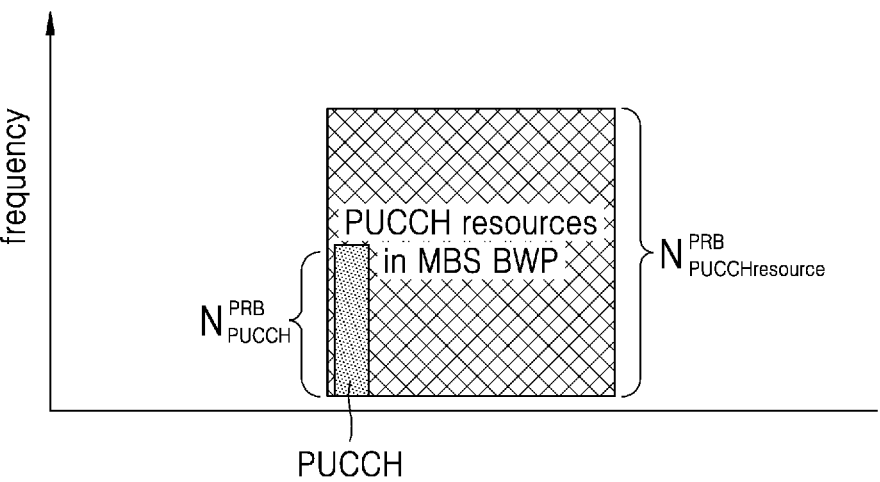
Figure 14:
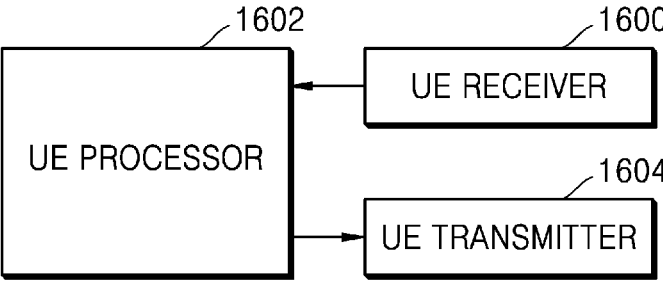
Figure 15:
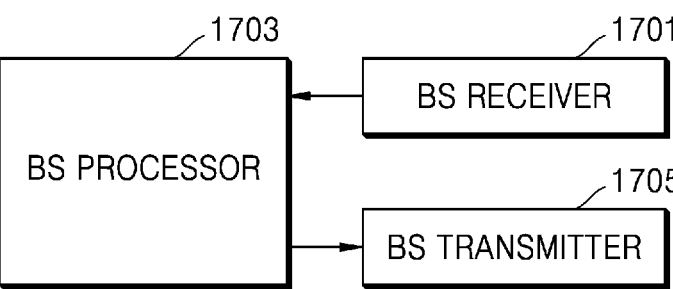

5 transmitted in a 5th generation (5G) communication system according to an embodiment of the disclosure;

FIG. 3 illustrates allocation of data for enhanced mobile broadband (eMBB), ultra-reliability low-latency communication (URLLC), and massive machine-type communication (mMTC) in a whole system frequency band according to an embodiment of the disclosure;

FIG. 4 is a diagram illustrating an example in which a system frequency band is divided and eMBB, URLLC, and mMTC data are allocated thereto according to an embodiment of the disclosure;

FIG. 5 illustrates an example of a procedure in which one transport block (TB) is divided into a plurality of codeblocks and a cyclic redundancy check (CRC) is added thereto according to an embodiment of the disclosure;

FIG. 6 is a diagram illustrating that a synchronization signal (SS) and a physical broadcast channel (PBCH) in an NR system are mapped to frequency and time domains according to an embodiment of the disclosure;

Figure 7:
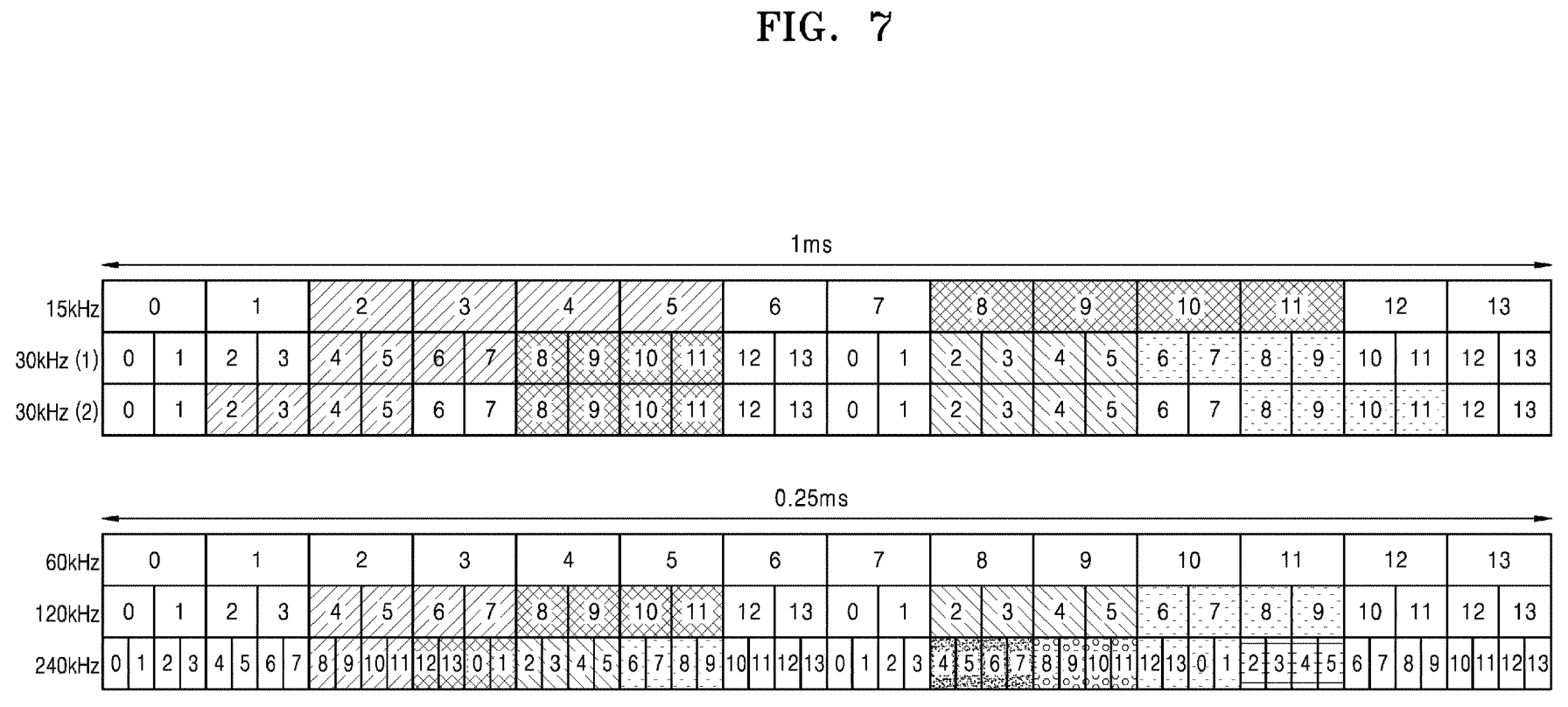

FIG. 7 is a diagram illustrating symbols on which an SS/PBCH block can be transmitted according to subcarrier spacings according to an embodiment of the disclosure;

FIG. 8 is a diagram illustrating user equipment (UE) processing time according to timing advance when a UE receives a first signal and transmits a second signal in response thereto, in the 5G or NR system according to an embodiment of the disclosure;

FIG. 9 is a diagram illustrating an example in which a base station (BS) schedules a plurality of pieces of data according to slots and transmits the data, receives hybrid automatic repeat request-acknowledgement (HARQ-ACK) feedback with respect to the data, and performs retransmission, in response to the feedback, in a 5G system according to an embodiment of the disclosure;

FIG. 10 is a diagram illustrating an example of groupcast in which same control information and data are transmitted from a BS to a plurality of UEs according to an embodiment of the disclosure;

FIG. 11 is a diagram illustrating an example in which bandwidth parts (BWPs) are configured in a UL and a DL according to an embodiment of the disclosure;

FIG. 12 is a diagram illustrating an example of a UL BWP configured for a UE1, a UL BWP configured for a UE2, and a UL BWP for multicast and broadcast services (MBS) commonly configured for two UEs according to an embodiment of the disclosure;

FIG. 13 is a diagram illustrating an example of a position of a physical uplink control channel (PUCCH) resource in a BWP configured for MBS according to an embodiment of the disclosure;

FIG. 14 is a diagram illustrating an internal structure of a UE according to embodiments of the disclosure; and FIG. 15 is a diagram illustrating an internal structure of a BS according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smailphone, a computer, a multimedia system capable of performing a communication function, or the like.

In the disclosure, a controller may also be referred to as a processor.

Throughout the specification, a layer (or a layer apparatus) may also be referred to as an entity.

A new radio (NR) access technology that is new 5th generation (5G) communication is designed to allow various services to be freely multiplexed in time and frequency resources, such that a reference signal, waveform/numerology, and the like may be dynamically or freely allocated according to requirements of a corresponding service. In wireless communication, data transmission that is optimized via measurement of a channel quality and interference is important to provide an optimal service to a user equipment (UE). Accordingly, it is requested to exactly measure a channel state. However, unlike 4th generation (4G) communication in which a channel and an interference characteristic are not sharply changed according to a frequency resource, in a case of a 5G channel, a channel and an interference characteristic are significantly changed according to services such that there is a need to support a frequency resource group (FRG) subset so as to separately measure the channel and the interference characteristic. Types of services that are supported in the NR system may be classified into categories including enhanced mobile broadband (eMBB), massive machine-type communication (mMTC), ultra-reliability low-latency communication (URLLC) services, or the like. The eMBB may be a service for high-speed transmission of a large amount of data, the mMTC may be a service for minimum power consumption of a UE and access of multiple UEs, and the URLLC may be a service for high reliability and low latency. Different requirements may be applied according to types of services to be applied to a UE.

As such, a plurality of services may be provided to a user in a communication service, and in order to provide the user with the plurality of services, a method of providing the services according to respective characteristics in same time duration and an apparatus using the method are required.

Hereinafter, embodiments of the disclosure will now be described in detail with reference to accompanying drawings.

In the following descriptions of embodiments, descriptions of techniques that are well known in the art and are not directly related to the disclosure are omitted. This is to clearly convey the gist of the disclosure by omitting an unnecessary explanation.

For the same reason, some components in the drawings are exaggerated, omitted, or schematically illustrated. Also, the size of each component does not entirely reflect the actual size. In the drawings, the same or corresponding components are denoted by the same reference numerals.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein. Rather, these embodiments are provided so that the disclosure will be thorough and complete and will fully convey the concept of the disclosure to one of ordinary skill in the art, and the disclosure will only be defined by the appended claims. Throughout the specification, like reference numerals denote like components.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate an entity for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including an instruction entity that performs the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~ unit" as used in the embodiment refers to a software or hardware component, such as field-programmable gate array (FPGA) or application-specific integrated circuit (ASIC), which performs certain tasks. However, the term "~ unit" does not mean to be limited to software or hardware. A "~ unit" may be configured to be in an addressable storage medium or configured to operate one or more processors. Thus, a "~ unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "~ units" may be combined into fewer components and "~ units" or further separated into additional components and "~ units." Further, the components and "~ units" may be implemented to operate one or more central processing units (CPUs) in a device or a secure multimedia card. Also, a "~ unit" may include one or more processors in embodiments.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), and LTE-Advanced (LTE-A) of the $3^{rd}$ Generation Partnership Project (3GPP), high rate packet data (HRPD) and ultra mobile broadband (UMB) of 3GPP2, 802.16e of the Institute of Electrical and Electronic Engineers (IEEE), or the like. Also, as the 5G wireless communication system, 5G or NR communication standards are being defined.

As a representative example of a broadband wireless communication system, the NR system has adopted an orthogonal frequency division multiplexing (OFDM) scheme in a downlink (DL) and an uplink (UL). In more detail, a cyclic-prefix OFDM (CP-OFDM) scheme has been adopted in the DL, and both the CP-OFDM scheme and a discrete Fourier transform spreading OFDM (DFT-S-OFDM) scheme have been adopted in the UL. The UL refers to a radio link in which a UE (or an MS) transmits data or a control signal to a base station (BS) (or a next generation Node B (gNode B, gNB)), and the DL refers to a radio link in which a BS transmits data or a control signal to a UE. The above-described multi-access schemes identify data or control information of different users in a manner that time-frequency resources for carrying the data or control information of the users are allocated and managed not to overlap each other, that is, to achieve orthogonality therebetween.

The NR system adopts a hybrid automatic repeat request (HARQ) scheme of retransmitting data at a physical layer when a decoding failure occurs in initial transmission. The HARQ scheme indicates that, when a receiver fails to correctly decode data, the receiver transmits decoding failure indication information (e.g., negative acknowledgement (NACK)) to a transmitter so as to allow the transmitter to retransmit the data at its physical layer. The receiver may combine the data, which is retransmitted by the transmitter, with data previously failed in decoding, thereby increasing data reception performance. Also, when the receiver correctly decodes the data, the transmitter transmits decoding success indication information (e.g., acknowledgement (ACK)) to the transmitter so as to allow the transmitter to transmit new data.

Figure 1:
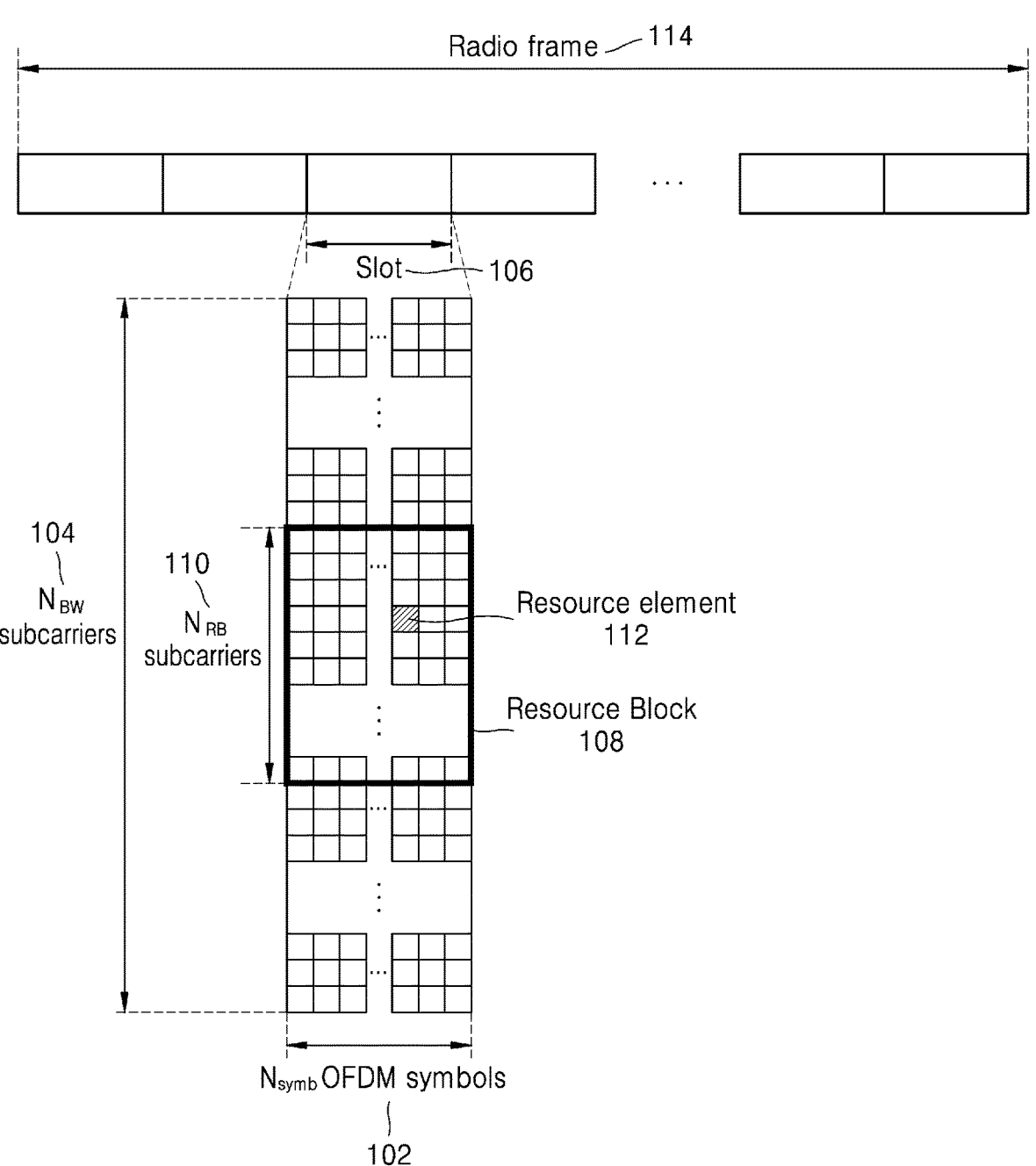
FIG. 1 is a diagram illustrating a basic structure of a time-frequency domain that is a radio resource domain in which data or a control channel is transmitted in a downlink (DL) or uplink (UL), in a new radio (NR) system according to an embodiment of the disclosure.

FIG. 1 is a diagram illustrating a basic structure of a time-frequency domain that is a radio resource domain in which data or a control channel is transmitted in a DL or UL, in an NR system according to an embodiment of the disclosure.

Figure 2:
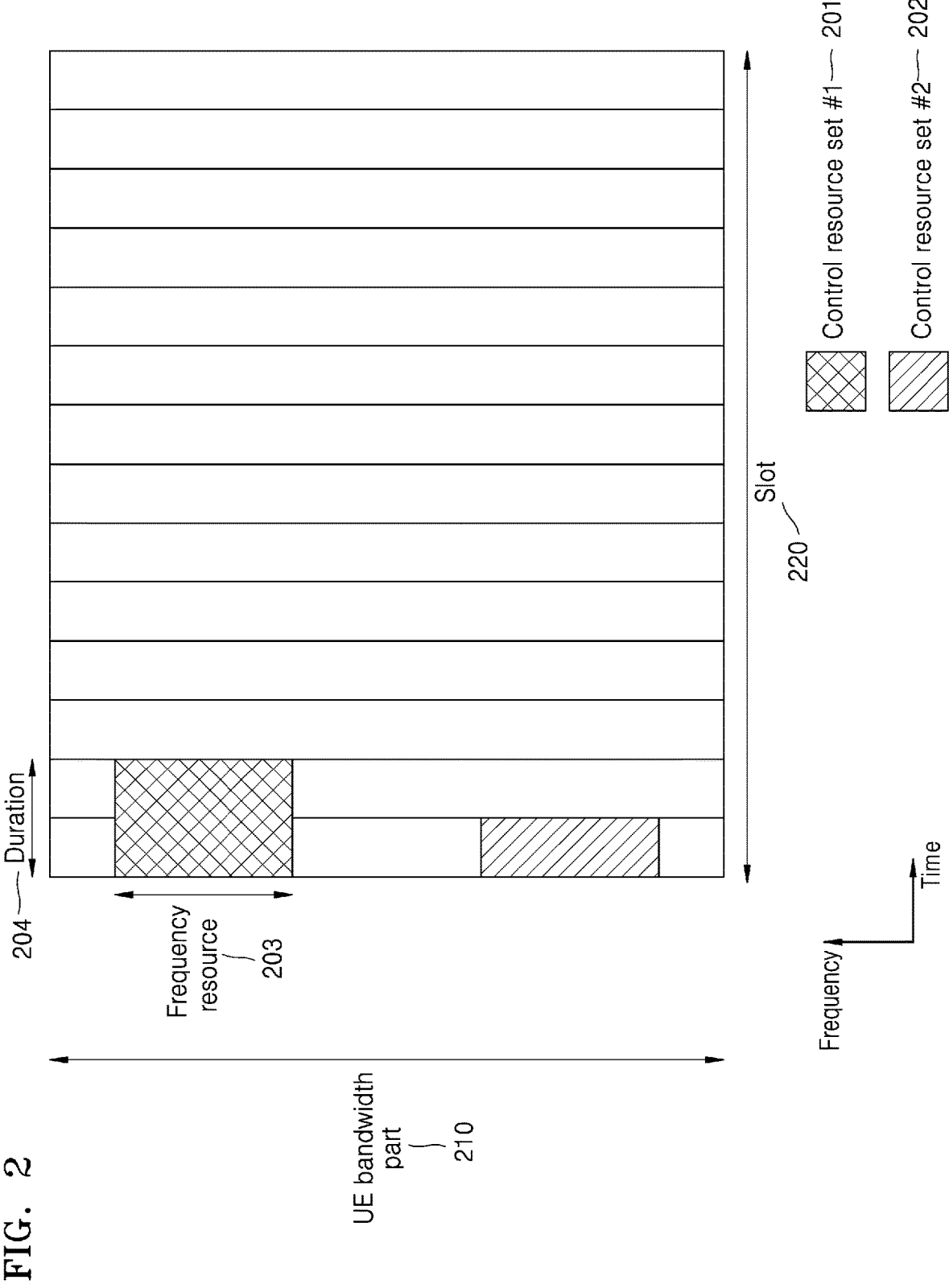
FIG. 2 is a diagram illustrating an example of a control resource set (CORESET) in which a DL control channel is

Referring to FIG. 1, the horizontal axis represents a time domain and the vertical axis represents a frequency domain. A minimum transmission unit in the time domain is an OFDM symbol, and $N_{symb}$ OFDM symbols 102 are gathered to constitute one slot 106. A length of a subframe is defined to be 1.0 ms, and a radio frame 114 is defined to be 10 ms. A minimum transmission unit in the frequency domain is a subcarrier, and a bandwidth of an entire system transmission bandwidth consists of a total of NBW subcarriers 104. 1 frame may be defined to be 10 ms. 1 subframe may be defined to be 1 ms, and thus, 1 frame may consist of a total of 10 subframes. 1 slot may consist of 14 OFDM symbols (i.e., the number of symbols per 1

$$\text{slot}\left(N_{symb}^{slot}\right) = 14\right).$$

subframe may consist of one or more slots, and the number of slots per 1 subframe may vary according to a configuration value $\mu$ with respect to a subcarrier spacing. FIG. 2 illustrates, as an example, a case of a subcarrier spacing configuration value $\mu=0$ and a case of $\mu=1$. In the case of $\mu=0$, 1 subframe may consist of 1 slot, and in the case of $\mu=1$, 1 subframe may consist of 2 slots. That is, according to a subcarrier spacing configuration value $\mu$, the number of slots per 1 subframe $$\left(N_{slot}^{subframe,\mu}\right)$$

may vary, and thus, the number of slots per 1 frame $$\left(N_{slot}^{frame,\mu}\right)$$

may vary.

$$N_{slot}^{subframe,\mu} \text{ and } N_{slot}^{frame,\mu}$$

according to each subcarrier spacing configuration value $\mu$ may be defined in Table 1 below.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

A UE before radio resource control (RRC) connection may receive configuration with respect to an initial bandwidth part (BWP) for initial connection from the BS via a master information block (MIB). In more detail, in order to receive system information (which may correspond to remaining system information (RMSI) or system information block 1 (SIB1)) for an initial access via an MIB in an initial access stage, the UE may receive configuration information with respect to a control resource set (CORESET) and a search space in which a physical downlink control channel (PDCCH) may be transmitted. The CORESET and the search space configured by the MIB may each be regarded as 0 for identity (ID). The BS may notify, via the MIB, the UE of configuration information such as frequency allocation information, time allocation information, numerology, and the like about CORESET#0. Also, the BS may notify, via the MIB, the UE of a monitoring period about CORESET#0 and configuration information about an occasion, i.e., configuration information about search space#0. The UE may regard a frequency domain configured as CORESET#0 and obtained from the MIB as an initial BWP for the initial access. Here, an identifier (ID) of the initial BWP may be regarded as 0.

The MIB may include information as below. However, the MIB is not limited thereto.

TABLE 2

```
MIB
-- ASN1START
-- TAG-MIB-START
MIB ::=                          SEQUENCE {
    systemFrameNumber                BIT STRING (SIZE (6)),
    subCarrierSpacingCommon          ENUMERATED {scs15or60, scs30or120},
    ssb-SubcarrierOffset             INTEGER (0....15),
    dmrs-TypeA-Position              ENUMERATED {pos2, pos3},
    pdcch-ConfigSIB1                 ,
    cellBarred                   ENUMERATED {barred, notBarred},
    intraFreqReselection             ENUMERATED {allowed, notAllowed},
    spare                        BIT STRING (SIZE (1))
}
-- TAG-MIB-STOP
-- ASN1STOP
```

TABLE 3

MIB field descriptions
cellBarred
Value barred means that the cell is barred, as defined in TS 38.304 [20].
dmrs-TypeA-Position
Position of (first) DM-RS for downlink (see TS 38.211 [16], clause 7.4.1.1.2) and
uplink (see TS 38.211 [16], clause 6.4.1.1.3).
intraFreqReselection
Controls cell selection/reselection to intra-frequency cells when the highest ranked cell
is barred, or treated as barred by the UE, as specified in TS 38.304 [20].

TABLE 3-continued pdcch-ConfigSIB1
Determines a common ControlResourceSet (CORESET), a common search space and
necessary PDCCH parameters. If the field ssb-SubcarrierOffset indicates that SIB1 is
absent, the field pdcch-ConfigSIB1 indicates the frequency positions where the UE
may find SS/PBCH block with SIB1 or the frequency range where the network does
not provide SS/PBCH block with SIB1 (see TS 38.213 [13], clause 13).
ssb-SubcarrierOffset
Corresponds to kSSB (see TS 38.213 [13]), which is the frequency domain offset
between SSB and the overall resource block grid in number of subcarriers. (See TS
38.211 [16], clause 7.4.3.1).
The value range of this field may be extended by an additional most significant bit
encoded within PBCH as specified in TS 38.213 [13].
This field may indicate that this cell does not provide SIB1 and that there is hence no
CORESET#0 configured in MIB (see TS 38.213 [13], clause 13). In this case, the field
pdcch-ConfigSIB1 may indicate the frequency positions where the UE may (not) find
a SS/PBCH with a control resource set and search space for SIB1 (see TS 38.213 [13],
clause 13).
subCarrierSpacingCommon
Subcarrier spacing for SIB1, Msg.2/4 for initial access, paging and broadcast SI-
messages. If the UE acquires this MIB on an FR1 carrier frequency, the value
scs15or60 corresponds to 15 kHz and the value scs30or120 corresponds to 30 kHz. If
the UE acquires this MIB on an FR2 carrier frequency, the value scs15or60
corresponds to 60 kHz and the value scs30or120 corresponds to 120 kHz.
systemFrameNumber
The 6 most significant bits (MSB) of the 10-bit System Frame Number (SFN). The 4
LSB of the SFN are conveyed in the PBCH transport block as part of channel coding
(i.e., outside the MIB encoding), as defined in clause 7.1 in TS 38.212 [17].

In a method of configuring a BWP, UEs before RRC connection may receive configuration information about an initial BWP via a MIB in an initial access stage. In more detail, the UE may be configured, from an MIB of a physical broadcast channel (PBCH), with a CORESET for a DL control channel via which downlink control information (DCI) for scheduling a system information block (SIB) can be transmitted. Here, a bandwidth of the CORESET configured by the MIB may be regarded as an initial BWP, and the UE may receive, via the configured initial BWP, a physical downlink shared channel (PDSCH) in which SIB is transmitted. The initial BWP may be used for other system information (OSI), paging, and a random access, as well as reception of the SIB.

When one or more BWPs are configured for the UE, the BS may indicate BWP switching by using a BWP indicator in DCI.

In the NR system, a frequency division duplex (FDD) system that identifies a DL and a UL by using frequencies may differ in a DL transmission bandwidth and a UL transmission bandwidth. A channel bandwidth indicates a radio frequency (RF) bandwidth that corresponds to a system transmission bandwidth. Each of Table 4 and Table 5 indicates some of corresponding relations of a system transmission bandwidth, a subcarrier spacing, and a channel bandwidth which are defined in the NR system for a frequency band lower than 6 GHz and a frequency band higher than 6 GHz. For example, a transmission bandwidth of the NR system having a 100-MHz channel bandwidth with a 30-kHz subcarrier spacing consists of 273 RBs. N/A below may be a combination of bandwidth-subcarrier which are not supported in the NR system. Table 4 below indicates a configuration of a frequency range 1 (FR1) and Table 5 indicates a configuration of FR2.

TABLE 4

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

A basic unit of a resource in a time-frequency domain is a resource element (RE) 112, and may be indicated by an OFDM symbol and a subcarrier index. A resource block (RB) 108 (also referred to as a physical resource block (PRB)) is defined by $N_{RB}$ consecutive subcarriers 110 in the frequency domain. In general, a minimum transmission unit of data is the RB unit. In the NR system, in general, $N_{symb}$=14 and $N_{RB}$=12, and $N_{BW}$ is proportional to a bandwidth of a system transmission band. A data rate may be increased, in proportion to the number of RBs scheduled for the UE.

TABLE 5

| Channel bandwidth BWChannel [MHz] | subcarrier spacing | 50 MHz | 100 MHz | 200 MHz | 400 MHz |
|---|---|---|---|---|---|
| Transmission bandwidth configuration NRB | 60 kHz | 66 | 132 | 264 | N/A |
| | 120 kHz | 32 | 66 | 132 | 264 |

In the NR system, a frequency range may be defined by being divided into FR1 and FR2 as shown in Table 6 below.

TABLE 6

| Frequency range designation | Corresponding frequency range |
|---|---|
| FR1 | 450 MHz–7125 MHz |
| FR2 | 24250 MHz–52600 MHz |

It may be possible that ranges of FR1 and FR2 are differently changed and applied. For example, a frequency range of FR1 may be changed and applied from 450 MHz up to 6000 MHz.

Next, a synchronization signal (SS)/PBCH block of the 5G communication system will now be described.

The SS/PBCH block may indicate a physical layer channel block consisting of a primary SS (PSS), a secondary SS (SSS), and a PBCH. In more detail, the SS/PBCH block may be defined as below.

PSS: A signal being a reference of DL time/frequency synchronization may provide some information of cell ID.

SSS: A signal being a reference of DL time/frequency synchronization may provide other information of cell ID which is not provided by the PSS. In addition, the SSS may function as a reference signal for demodulation of a PBCH.

PBCH: It may provide essential system information requested by a UE to transmit or receive a data channel and a control channel The essential system information may include search space-related control information indicating radio resource mapping information of a control channel, scheduling control information about a separate data channel to transmit system information, and the like.

SS/PBCH block: The SS/PBCH block may consist of a combination of the PSS, the SSS, and the PBCH. One or more of the SS/PBCH blocks may be transmitted in a time of 5 ms, and each of the SS/PBCH blocks being transmitted may be identified by an index.

The UE may detect the PSS and the SSS in the initial access stage, and may decode the PBCH. The UE may obtain the MIB from the PBCH, and may be configured with CORESET #0 (may correspond to a control region of which control region index is 0). The UE may assume that the selected SS/PBCH block and a demodulation reference signal (DMRS) transmitted in CORESET #0 are quasi co located (QCL), and may perform monitoring on CORESET #0. The UE may receive system information based on DL control information transmitted in CORESET #0. The UE may obtain, from the received system information, configuration information related to a random access channel (RACH) necessary for the initial access. The UE may transmit a physical RACH (PRACH) to the BS, in consideration of a selected SS/PBCH index, and when receiving the PRACH, the BS may obtain information about an index of the SS/PBCH block selected by the UE. Through the above procedure, the BS may identify which block from among SS/PBCH blocks is selected by the UE and the UE monitors CORESET #0 associated with the selected SS/PBCH block.

Next, DCI of the 5G system will now be described in detail.

Scheduling information about UL data (or a physical UL data channel (a physical uplink shared channel (PUSCH)) or DL data (or a physical DL data channel (a physical downlink shared channel (PDSCH)) in the 5G system may be transmitted from a BS to a UE. The UE may monitor, with respect to the PUSCH or the PDSCH, a DCI format for fallback and a DCI format for non-fallback. The DCI format for fallback may be configured as a fixed field predefined between the BS and the UE, and the DCI format for non-fallback may include a configurable field. In addition to them, DCI may include various formats, and according to each of the formats, the DCI may indicate whether it is DCI for power control, it is DCI for notifying a slot format indicator (SFI), or the like.

The DCI may be channel-coded and modulated and then may be transmitted via a PDCCH that is a physical DL control channel A cyclic redundancy check (CRC) may be added to a payload of a DCI message, and may be scrambled by a radio network temporary identifier (RNTI) corresponding to an identity of the UE. According to an objective of the DCI message, e.g., transmission of UE-specific data, a power control command, a random access response, or the like, different RNTIs may be used. That is, the RNTI may not be explicitly transmitted but may be included in a CRC calculation process and transmitted. When the DCI message transmitted on the PDCCH is received, the UE may check the CRC by using the allocated RNTI, and as a result of the checking, when the CRC is correct, the UE may identify that a corresponding message is transmitted to the UE. The PDCCH may be mapped and transmitted in a CORESET configured for the UE.

For example, DCI for scheduling PDSCH about system information (SI) may be scrambled by a SI-RNTI. DCI for scheduling PDSCH about a random access response (RAR) may be scrambled by an RA-RNTI. DCI for scheduling PDSCH about a paging message may be scrambled by a P-RNTI. DCI for notifying a slot format indicator (SFI) may be scrambled by an SFI-RNTI. DCI for notifying transmit power control (TPC) may be scrambled by a TPC-RNTI. DCI for scheduling a UE-specific PDSCH or PUSCH may be scrambled by a cell RNTI (C-RNTI). The fact that an RNTI value is scrambled to DCI may mean that the RNTI value is added by using an XOR operation (0+0=0, 1+0=1, 1+1=0) to a CRC bit of the DCI. The XOR operation may be the modulo-2 operation. When the number of bits of a CRC of DCI is different from the number of bits of an RNTI, operation may be performed with a least significant bit (LSB) or a most significant bit (MSB) with a longer number of bits. For example, in a case where a CRC of DCI is 24 bits, and an RNTI is 16 bits, the RNTI may be scrambled to 16 bits of an LSB of the CRC.

DCI format 0_0 may be used as fallback DCI for scheduling a PUSCH, and in this regard, a CRC thereof may be scrambled by a C-RNTI. The DCI format 0_0 of which CRC is scrambled by the C-RNTI may include a plurality of pieces of information below. However, the disclosure is not limited thereto.

Identifier for DCI formats—[1] bit

Frequency domain resource assignment—

$$\left\lceil \log_2\left(N_{RB}^{UL,BWP}\left(N_{RB}^{UL,BWP}+1\right)/2\right)\right\rceil \text{ bits}$$

Time domain resource assignment—X bits

Frequency hopping flag—1 bit

Modulation and coding scheme—5 bits

New data indicator—1 bit

Redundancy version—2 bits

HARQ process number—4 bits

Transmit power control (TPC) command for scheduled PUSCH—[2] bits

UL/supplementary UL (SUL) indicator—0 or 1 bit

DCI format 0_1 may be used as non-fallback DCI for scheduling a PUSCH, and in this regard, a CRC thereof may be scrambled by a C-RNTI. The DCI format 0_1 of which CRC is scrambled by the C-RNTI may include a plurality of pieces of information below. However, the disclosure is not limited thereto.

Carrier indicator—0 or 3 bits

UL/SUL indicator—0 or 1 bit

Identifier for DCI formats—[1] bits

BWP indicator—0, 1 or 2 bits

Frequency domain resource assignment

For resource allocation type 0, $$\lceil N_{RB}^{UL,BWP}/P \rceil \text{ bits}$$

For resource allocation type 1, $$\lceil \log_2(N_{RB}^{UL,BWP}(N_{RB}^{UL,BWP}+1)/2 \rceil \text{ bits}$$

Time domain resource assignment—1, 2, 3, or 4 bits

Virtual resource block (VRB)-to-physical resource block (PRB) mapping—0 or 1 bit, only for resource allocation type 1.

0 bit if only resource allocation type 0 is configured; 1 bit otherwise.

Frequency hopping flag—0 or 1 bit, only for resource allocation type 1.

0 bit if only resource allocation type 0 is configured; 1 bit otherwise.

Modulation and coding scheme—5 bits

New data indicator—1 bit

Redundancy version—2 bits

HARQ process number—4 bits

1st downlink assignment index—1 or 2 bits 1 bit for semi-static HARQ-ACK codebook;

2 bits for dynamic HARQ-ACK codebook with single HARQ-ACK codebook.

2nd downlink assignment index—0 or 2 bits 2 bits for dynamic HARQ-ACK codebook with two HARQ-ACK sub-codebooks;

0 bit otherwise.

TPC command for scheduled PUSCH—2 bits

SRS resource indicator—

$$\left\lceil \log_2\left( \sum_{k=1}^{L_{max}} \binom{N_{SRS}}{k} \right) \right\rceil$$

or $\lceil \log_2(N_{SRS}) \rceil$ bits $$\left\lceil \log_2\left( \sum_{k=1}^{L_{max}} \binom{N_{SRS}}{k} \right) \right\rceil \text{ bits}$$

for non-codebook based PUSCH transmission;

$\lceil \log_2(N_{SRS}) \rceil$ bits for codebook based PUSCH transmission.

Precoding information and the number of layers—up to 6 bits

Antenna ports—up to 5 bits

Sounding reference signal (SRS) request—2 bits

Channel state information (CSI) request—0, 1, 2, 3, 4, 5, or 6 bits

Code block group (CBG) transmission information—0, 2, 4, 6, or 8 bits

Phase tracking reference signal (PTRS)-DMRS association—0 or 2 bits.

beta_offset indicator—0 or 2 bits

DMRS sequence initialization—0 or 1 bit

DCI format 1_0 may be used as fallback DCI for scheduling a PDSCH, and in this regard, a CRC thereof may be scrambled by a C-RNTI. The DCI format 1_0 of which CRC is scrambled by the C-RNTI may include a plurality of pieces of information below. However, the disclosure is not limited thereto.

Identifier for DCI formats—[1] bit

Frequency domain resource assignment $$\lceil \lceil \log_2(N_{RB}^{DL,BWP}(N_{RB}^{DL,BWP}+1)/2 \rceil \rceil \text{ bits}$$

Time domain resource assignment—X bits

VRB-to-PRB mapping—1 bit.

Modulation and coding scheme—5 bits

New data indicator—1 bit

Redundancy version—2 bits

HARQ process number—4 bits

Downlink assignment index—2 bits

TPC command for scheduled PUCCH—[2] bits

Physical uplink control channel (PUCCH) resource indicator—3 bits

PDSCH-to-HARQ feedback timing indicator—[3] bits

DCI format 1_1 may be used as non-fallback DCI for scheduling a PDSCH, and in this regard, a CRC thereof may be scrambled by a C-RNTI. The DCI format 1_1 of which CRC is scrambled by the C-RNTI may include a plurality of pieces of information below. However, the disclosure is not limited thereto.

Carrier indicator—0 or 3 bits

Identifier for DCI formats—[1] bits

BWP indicator—0, 1 or 2 bits

Frequency domain resource assignment

For resource allocation type 0, $$\lceil N_{RB}^{DL,BWP}/P \rceil \text{ bits}$$

For resource allocation type 1, $$\lceil \log_2(N_{RB}^{DL,BWP}(N_{RB}^{DL,BWP}+1)/2 \rceil$$

bits

Time domain resource assignment—1, 2, 3, or 4 bits

VRB-to-PRB mapping—0 or 1 bit, only for resource allocation type 1.

0 bit if only resource allocation type 0 is configured; 1 bit otherwise.

PRB bundling size indicator—0 or 1 bit

Rate matching indicator—0, 1, or 2 bits

Zero power (ZP) CSI-Reference signal (RS) trigger—0, 1, or 2 bits

For transport block 1:

Modulation and coding scheme—5 bits

New data indicator—1 bit

Redundancy version—2 bits
For transport block 2:
Modulation and coding scheme—5 bits
New data indicator—1 bit
Redundancy version—2 bits
HARQ process number—4 bits
Downlink assignment index—0 or 2 or 4 bits
TPC command for scheduled PUCCH—2 bits
PUCCH resource indicator—3 bits
PDSCH-to-HARQ_feedback timing indicator—3 bits
Antenna ports—4, 5 or 6 bits
Transmission configuration indication—0 or 3 bits
SRS request—2 bits
CBG transmission information—0, 2, 4, 6, or 8 bits
CBG flushing out information—0 or 1 bit
DMRS sequence initialization—1 bit Hereinafter, a method of allocating a time domain resource to a data channel in the 5G communication system will now be described.

A BS may configure a UE with Table of time domain resource allocation information about PDSCH and PUSCH via higher layer signaling (e.g., RRC signaling). For example, the BS may configure Table consisting of a maximum of maxNrofDL–Allocations=16 entries with respect to the PDSCH, and may configure Table consisting of a maximum of maxNrofUL–Allocations=16 entries with respect to the PUSCH. For example, time domain resource allocation information may include PDCCH-to-PDSCH slot timing (corresponding to a time interval of slot units between a time when a PDCCH is received and a time when a PDSCH scheduled by the received PDCCH is transmitted, and marked as K0), PDCCH-to-PUSCH slot timing (corresponding to a time interval of slot units between a time when a PDCCH is received and a time when a PUSCH scheduled by the received PDCCH is transmitted, and marked as K2), information about a position and length of a start symbol in a slot on which PDSCH or PUSCH is scheduled, a mapping type of PDSCH or PUSCH, and the like. For example, a plurality of pieces of information as in Table 7 and Table 8 below may be notified from the BS to the UE. However, the disclosure is not limited thereto.

TABLE 8-continued

```
PUSCH-TimeDomainResourceAllocation ::=    SEQUENCE {
    k2       INTEGER(0...32)    OPTIONAL, -- Need S
    (PDCCH-to-PUSCH timing, slot unit)
    mapping Type    ENUMERATED {typeA, typeB},
    (PUSCH mapping type)
    startSymbolAndLength    INTEGER (0...127)
    (Start symbol and length of PUSCH)
}
```

The BS may notify the UE of one of entries of Table about the time domain resource allocation information via L1 signaling (e.g., DCI) (e.g., may indicate using a 'time domain resource allocation' field in the DCI). The UE may obtain the time domain resource allocation information about PDSCH or PUSCH, based on the DCI received from the BS.

Hereinafter, a DL control channel in the 5G communication system will now be described in detail with accompanying drawing.

FIG. 2 is a diagram illustrating an example of a CORESET in which a DL control channel is transmitted in the 5G communication system according to an embodiment of the disclosure. Referring to FIG. 2, it illustrates an embodiment in which a UE BWP 210 is configured on a frequency axis, and two CORESETs (CORESET #1 201 and CORESET #2 202) are configured in one slot 220 on a time axis. The CORESETs 201 and 202 may be configured to a specific frequency resource 203 within the entire UE BWP 210 on the frequency axis. The CORESETs 201 and 202 may be configured as one or more OFDM symbols on the time axis and may be defined as control resource set duration 204. Referring to the example of FIG. 2, the CORESET #1 201 may be configured as the control resource set duration of two symbols, and the CORESET #2 202 may be configured as the control resource set duration of one symbol.

The CORESET in the 5G communication system may be configured by the BS for the UE via higher layer signaling (e.g., system information, an MIB, or RRC signaling). Configuring the UE with the CORESET may mean provid-

TABLE 7

```
PDSCH-TimeDomainResourceAllocationList information element
PDSCH-TimeDomainResourceAllocationList ::= SEQUENCE
(SIZE(1...maxNrofDL-Allocations)) OF PDSCH-TimeDomainResourceAllocation
PDSCH-TimeDomainResourceAllocation ::=          SEQUENCE {
    k0                              INTEGER(0...32)    OPTIONAL, -- Need S
    (PDCCH-to-PDSCH timing, slot unit)
    mappingType                     ENUMERATED {typeA, typeB},
    (PDSCH mapping type)
    startSymbolAndLength            INTEGER (0... 127)
    (Start symbol and length of PDSCH)
}
```

TABLE 8

```
PUSCH-TimeDomainResourceAllocation information element
PUSCH-TimeDomainResourceAllocationList ::=    SEQUENCE
(SIZE(1...maxNrofUL-Allocations)) OF
PUSCH-TimeDomainResourceAllocation
``` ing information such as an identity of the CORESET, a frequency position of the CORESET, symbol duration of the CORESET, and the like. For example, higher layer signaling may include a plurality of pieces of information as shown in Table 9 below. However, the disclosure is not limited thereto.

TABLE 9

```
ControlResourceSet ::=                      SEQUENCE {
        -- Corresponds to L1 parameter 'CORESET-ID'
        controlResourceSetId            type,
    (CORESET Identity)
        frequencyDomainResources        BIT STRING (SIZE
(45)),
    (Frequency axis resource allocation information)
        duration                        INTEGER
(1...maxCoReSetDuration),
    (Time axis resource allocation information)
        cce-REG-MappingType             CHOICE
{
    (CCE-to-REG mapping type)
        interleaved
        SEQUENCE {
            reg-BundleSize
        ENUMERATED {n2, n3, n6},
        (REG bundle size)
            precoderGranularity
        ENUMERATED {sameAsREG-bundle, allContiguousRBs},
            interleaverSize
        ENUMERATED {n2, n3, n6}
            (Interleaver size)
            shiftIndex
        INTEGER(0...maxNrofPhysicalResourceBlocks-1)
            OPTIONAL
            (Interleaver shift)
    },
        nonInterleaved                  NULL
        },
        tci-StatesPDCCH                 SEQUENCE(SIZE (1...maxNrofTCI-
StatesPDCCH)) OF TCI-StateId            OPTIONAL,
    (QCL configuration information)
        tci-PresentInDCI                ENUMERATED
{enabled}
            OPTIONAL, -- Need S
}
```

In Table 9, tci-StatesPDCCH (referred to as transmission configuration indication (TCI) state) configuration information may include information about one or more SS/PBCH block indices having a quasi co located (QCL) relation with a DMRS transmitted in the corresponding CORESET or a channel state information reference signal (CSI-RS) index.

For example, DCI format 1_1 that is scheduling control information (DL grant) about DL data may include a plurality of pieces of control information below. However, the disclosure is not limited thereto.

Carrier indicator: indicates on which carrier data scheduled by DCI is to be transmitted—0 or 3 bits Identifier for DCI formats: indicates a DCI format and, in particular, is an indicator to identify whether corresponding DCI is for DL or UL.—[1] bits Bandwidth part indicator: in an event of BWP switching, indicates it—0, 1 or 2 bits Frequency domain resource assignment: is resource assignment information for indicating frequency domain resource assignment, and a resource to indicate varies according to whether a resource assignment type is 0 or 1.

Time domain resource assignment: is resource assignment information for indicating time domain resource assignment, and may indicate time domain resource assignment via higher layer signaling or one configuration from a predetermined PDSCH time domain resource assignment list—1, 2, 3, or 4 bits VRB-to-PRB mapping: indicates a mapping relation between a VRP and a PRB—0 or 1 bit PRB bundling size indicator: indicates a PRB bundling size assumed for which same precoding is to be applied—0 or 1 bit Rate matching indicator: indicates which rate match group is to be applied from among rate match groups configured for a PDSCH by higher layer signaling—0, 1, or 2 bits ZP CSI-RS trigger: triggers ZP CSI-RS—0, 1, or 2 bits Transport block (TB) configuration information: indicates modulation and coding scheme (MCS), new data indicator (NDI), and redundancy version (RV) with respect to one or two TBs.

MCS: indicates a modulation scheme and a coding rate used in data transmission. That is, it may indicate a coding rate value for notifying a transport block size (TBS) and channel coding information as well as information whether it is quadrature phase shift keying (QPSK), 16 quadrature amplitude modulation (QAM) 64 QAM, or 256 QAM.

NDI: indicates whether it is initial transmission or retransmission of HARQ.

RV: indicates a redundancy version of HARQ.

HARQ process number: indicates a HARQ process number to be applied to a PDSCH—4 bits Downlink assignment index: is an index for generating a dynamic HARQ-ACK codebook for reporting HARQ-ACK with respect to a PDSCH—0 or 2 or 4 bits TPC command for scheduled PUCCH: is power control information to be applied to a PUCCH for reporting HARQ-ACK with respect to a PDSCH—2 bits PUCCH resource indicator: is information indicating a resource of PUCCH for reporting HARQ-ACK with respect to a PDSCH—3 bits PDSCH-to-HARQ_feedback timing indicator: is configuration information indicating in which slot a PUCCH for reporting HARQ-ACK with respect to a PDSCH is to be transmitted—3 bits Antenna ports: is information indicating an antenna port of a PDSCH DMRS and a DMRS code division multiplexing (CDM) group within which a PDSCH is not transmitted—4, 5 or 6 bits Transmission configuration indication: is information indicating beam information of a PDSCH—0 or 3 bits SRS request: is information requesting SRS transmission—2 bits CBG transmission information: is information indicating, when CBG-based retransmission is configured, which data corresponding to which CBG is to be transmitted via a PDSCH—0, 2, 4, 6, or 8 bits CBG flushing out information: is information indicating whether a CBG a UE previously received is usable in HARQ combining—0 or 1 bit DMRS sequence initialization: indicates a DMRS sequence initialization parameter—1 bit For data transmission via PDSCH or PUSCH, time domain resource assignment may be indicated by using information of a slot on which PDSCH/PUSCH is transmitted, and S that is a start symbol position in the slot and L that is the number of symbols to which the PDSCH/PUSCH is mapped. S may be a relative position from a start of the slot, L may be a consecutive number of symbols, and S and L may be determined from a start and length indicator value (SLIV) defined as Equation 1 below.

$$
\begin{aligned}
&\text{if } (L-1) \le 7 \text{ then} \qquad\qquad \text{Equation 1}\\
&\quad SLIV = 14 \cdot (L-1) + S\\
&\text{else}\\
&\quad SLIV = 14 \cdot (14 - L + 1) + (14 - 1 - S)\\
&\quad\text{where } 0 < L \le 14 - S
\end{aligned}
$$

In the NR system, the UE may be configured, via RRC configuration, with one row of information of a SLIV value, a PDSCH/PUSCH mapping type, and a slot on which PDSCH/PUSCH is transmitted (e.g., the information may be configured in the form of Table). Then, time domain resource assignment of DCI indicates an index value of configured Table, and by doing so, the BS can transmit, to the UE, the information of a SLIV value, a PDSCH/PUSCH mapping type, and a slot on which PDSCH/PUSCH is transmitted.

In the NR system, the PDSCH mapping type is defined as type A and type B. In a PDSCH mapping type A, a first symbol among DMRS symbols is positioned in a second or third OFDM symbol of a slot. In a PDSCH mapping type B, a first symbol among DMRS symbols is positioned in a first OFDM symbol in a time domain resource allocated for PDSCH transmission.

DL data may be transmitted on a PDSCH that is a physical channel for transmission of DL data. The PDSCH may be transmitted after control channel transmission duration, and scheduling information, such as a concrete mapping position or a modulation scheme in the frequency domain, may be determined based on the DCI transmitted on the PDCCH.

The BS may notify the UE of a modulation scheme applied to the PDSCH to be transmitted and a size of data to be transmitted (transport block size (TBS)) through a MCS in the control information configuring the DCI. According to an embodiment of the disclosure, the MCS may be composed of 5 bits, or may be composed of bits less than or greater than 5 bits. The TBS corresponds to a size before channel coding for error correction is applied to data (a transport block (TB)) to be transmitted by the BS.

In the disclosure, the TB may include a medium access control (MAC) header, a MAC control element (MAC CE), one or more MAC service data units (MAC SDUs), and padding bits. Alternatively, the TB may refer to a data unit or a MAC protocol data unit (MAC PDU) delivered from a MAC layer to a physical layer.

The modulation scheme supported in the NR system is QPSK, 16 QAM, 64 QAM, or 256 QAM and modulation orders (Qm) respectively correspond to 2, 4, 6, and 8. That is, 2 bits per symbol may be transmitted in QPSK, 4 bits per symbol may be transmitted in 16 QAM, 6 bits per symbol may be transmitted in 64 QAM and 8 bits per symbol may be transmitted in 256 QAM.

FIGS. 3 and 4 illustrate that a plurality of pieces of data for eMBB, URLLC, and mMTC services considered in the 5G or NR system are allocated in frequency-time resources according to various embodiments of the disclosure.

Referring to FIGS. 3 and 4, how frequency and time resources are allocated for transmission of information in each system is shown.

FIG. 3 illustrates allocation of data for eMBB, URLLC, and mMTC in a whole system frequency band. First, FIG. 3 illustrates allocation of data for eMBB, URLLC, and mMTC in a whole system frequency band 300. While an eMBB 301 and an mMTC 309 are allocated in a particular frequency band and are transmitted, when a plurality of pieces of URLLC data 303, 305, and 307 occur to be transmitted, the plurality of pieces of URLLC data 303, 305, and 307 may be transmitted without transmitting or emptying allocated portions for the eMBB 301 and the mMTC 309. Because it is necessary for URLLC among services to reduce latency, URLLC data may be allocated to portions 303, 305, and 307 of a resource 301 to which eMBB is allocated and may be transmitted. Obviously, when URLLC is additionally allocated and transmitted on a resource to which eMBB is allocated, eMBB data may not be transmitted on an overlapping frequency-time resource, and thus transmission performance of the eMBB data may be decreased. That is, in the above case, an eMBB data transmission failure due to allocation of URLLC may occur.

FIG. 4 is a diagram illustrating an example in which a system frequency band is divided and eMBB, URLLC, and mMTC data are allocated thereto. Referring to FIG. 4, a whole system frequency band 400 may be divided, and service and data may be transmitted in each of sub-bands 402, 404, and 406. Configuration information related to the sub-bands may be preset and may be transmitted from a BS to a UE by higher layer signaling. Alternatively, the BS or a network node may randomly divide the sub-bands and may provide services without separately transmitting sub-band configuration information to the UE. FIG. 4 illustrates that the sub-band 402 is used in transmission of eMBB data 408, the sub-band 404 is used in transmission of URLLC data 410, 412m and 414, and the sub-band 406 is used in transmission of mMTC data 418.

In order to describe a method and apparatus proposed in various embodiments of the disclosure, the terms of physical channel and signal in the NR system may be used. However, content of the disclosure may be applied not only to the NR system but also applied to a wireless communication system.

Hereinafter, various embodiments of the disclosure will be described in detail with reference to accompanying drawings. In the descriptions of the disclosure, detailed explanations of the related art are omitted when it is deemed that they may unnecessarily obscure the essence of the disclosure. The terms used in the specification are defined in consideration of functions used in the disclosure, and can be changed according to the intent or commonly used methods of users or operators. Accordingly, definitions of the terms are understood based on the entire description of the disclosure.

In the disclosure, a DL refers to a wireless transmission path of a signal to be transmitted from a BS to a UE, and an UL refers to a wireless transmission path of a signal to be transmitted from a UE to a BS.

Although the NR system is described as an example in the following description, embodiments of the disclosure may also be applied to other communication systems having similar technical backgrounds or channel types. Furthermore, the embodiments of the disclosure may also be applied to other communication systems through partial modification without greatly departing from the scope of the disclosure based on determination by one of ordinary skill in the art.

In the disclosure, legacy terms of a physical channel and a signal may be interchangeably used with data or a control signal. For example, a PDSCH refers to a physical channel via which data is transmitted, but in the disclosure, the PDSCH may refer to data.

Hereinafter, in the disclosure, higher layer signaling refers to a method of transmitting a signal from a BS to a UE by using a DL data channel of a physical layer or transmitting a signal from the UE to the BS by using a UL data channel of a physical channel, and may also be referred to as RRC signaling or a MAC CE.

FIG. 5 illustrates an example of a procedure in which one TB is divided into a plurality of codeblocks and a CRC is added thereto according to an embodiment of the disclosure.

Referring to FIG. 5, one TB 501 to be transmitted in a UL or DL may be added with a CRC 503 at its header or tail. The CRC 503 may have 16 bits, 24 bits, or a prefixed number of bits, or may have bits varying depending on a channel condition, or the like, and may be used in determination of whether channel coding is successful. A block of the TB 501 to which the CRC 503 is added may be divided into a plurality of codeblocks (CBs) 507, 509, 511, and 513 at operation 505. Here, a maximum size of the divided CBs 507, 509, 511, and 513 may be prefixed, and in this case, the last CB 513 may have as a size being smaller than the other CBs 507, 509, and 511. However, this is merely an example, and according to another embodiment of the disclosure, 0, a random value, or 1 may be inserted into the last CB 513, such that a length of the last CB 513 may be synchronized with lengths of the other CBs 507, 509, and 511.

Also, CRCs 517, 519, 521, and 523 may be respectively added to the CBs 507, 509, 511, and 513 at operation 515. A CRC may have 16 bits, 24 bits, or a prefixed number of bits, and may be used in determination of whether channel coding is successful.

The TB 501 and cyclic generator polynomial may be used to generate the CRC 503, and the cyclic generator polynomial may be defined in various ways. For example, assuming that cyclic generator polynomial for a 24-bit CRC is $g_{CRC24A}(D)=D^{24}+D^{23}+D^{18}+D^{17}+D^{14}+D^{11}+D^{10}+D^{7}+D^{6}+D^{5}+D^{4}+D^{3}+D+1$, and L=24, for TB data $a_0$, $a_1$, $a_2$, $a_3$, ..., $a_{A-1}$, CRC $p_0$, $p_1$, $p_2$, $p_3$, ..., $p_{L-1}$ may be determined to be a value with a remainder of 0 which is obtained by dividing $\alpha_0 D^{A+L-1}+\alpha_0 D^{A+L-2}+$ ... $+\alpha_{A-1}D^{L}+p_0 D^{L-1}+p_1 D^{L-2}+$ ... $+p_{L-2}D^1+p_{L-1}$ by $g_{CRC24A}(D)$. In the above example, a CRC length L may be determined to be any of various lengths including 12, 16, 24, 32, 40, 48, 64, or the like.

After a CRC is added to a TB in the above procedure, the TB+CRC may be divided into N CBs (e.g., the CBs 507, 509, 511, and 513). The CRC 517, 519, 521, and 523 may be respectively added to the divided CBs 507, 509, 511, and 513 at operation 515. Compared to the CRC added to the TB, a CRC added to a CB may have a different length or different cyclic generator polynomial may be used to generate the CRC. Also, the CRC 503 added to the TB 501, and the CRC 517, 519, 521, and 523 added to the CBs 507, 509, 511, and 513 may be omitted according to a type of a channel code to be applied to a CB. For example, when an LDPC code, not a turbo code, is to be applied to the CBs 507, 509, 511, and 513, the CRCs 517, 519, 521, and 523 to be added to the CBs 507, 509, 511, and 513 may be omitted.

As another example, even when the LDPC is applied, the CRCs 517, 519, 521, and 523 may be added to the CBs 507, 509, 511, and 513. Also, when a polar code is used, a CRC may be added or omitted.

As described above with reference to FIG. 5, a maximum length of one CB may be determined according to a type of channel coding to be applied, and a TB to be transmitted and a CRC to be added to the TB may be divided into a plurality of CBs according to the maximum length of the CB. In the LTE system, a CRC for CB is added to a divided CB, and a data bit of the CB and the CRC are encoded with a channel code to determine coded bits, and each of the coded bits is rate matched in a predefined manner such that a bit number may be determined.

[TB Size (TBS) Determination Scheme]

In the NR system according to various embodiments of the disclosure, a TB size (TBS) with respect to a UL and a DL may be calculated through processes below. Here, definitions of primary parameters conform to the 3GPP standard rules of TS 38.214.

Step 1:

$$N'_{RE}$$

that is the number of REs per one PRB, which is allocated to PDSCH mapping in an allocated resource.

$$N'_{RE}$$

may be calculated as $$N'_{RE} = N^{RB}_{sc} \cdot N^{sh}_{symb} - N^{PRB}_{DMRS} - N^{PRB}_{oh}$$

Here, $$N^{RB}_{sc}$$

is 12, and $$N^{sh}_{symb}$$

may indicate the number of OFDM symbols allocated to a PDSCH.

$$N_{DMRS}^{PRB}$$

indicates the number of REs per one PRB, which is occupied by a DMRS of a same CDM group.

$$N_{oh}^{PRB}$$

indicates the number of REs per one PRB, which is occupied by an overhead configured by higher layer signaling, and may be configured to be one of 0, 6, 12, and 18. Afterward, $N_{RE}$ that is a total number of REs allocated to the PDSCH may be calculated. $N_{RE}$ is calculated as $$N_{RE} = \min(156, N'_{RE}) \cdot n_{PRB}$$

and $n_{PRB}$ indicates the number of PRBs allocated to the UE.

Step 2: $N_{info}$ that is temporary information bits may be calculated as $N_{RE} \cdot R \cdot Q_m \cdot v$. Here, R indicates a code rate, $Q_m$ indicates a modulation order, and information of the value may be delivered by using Table predefined with a MCS bit field of DCI. Also, v indicates the number of allocated layers. If $N_{info} < 3824$, TBS may be calculated through Step 3 below. Otherwise, TBS may be calculated through Step 4.

Step 3:

$$N'_{info}$$

may be calculated by using Equations of $$N'_{info} = \max\left(24, 2^n \cdot \left\lfloor \frac{N_{info}}{2^n} \right\rfloor\right) \text{ and } n = \max(3, \lfloor \log_2 N_{info} \rfloor - 6).$$

TBS may be determined as a value closest to $$N'_{info}$$

from among values in Table 10 below that are not smaller than $$N'_{info}.$$

TABLE 10

| Index | TBS |
| --- | --- |
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |

TABLE 10-continued

| Index | TBS |
| --- | --- |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |

TABLE 10-continued

| Index | TBS |
|-------|------|
| 89 | 3368 |
| 90 | 3496 |
| 91 | 3624 |
| 92 | 3752 |
| 93 | 3824 |

Step 4:

$$N'_{info}$$

may be calculated by using Equations of $$N'_{info} = \max\left(3840,\, 2^n \times \text{round}\left(\frac{N_{info} - 24}{2^n}\right)\right) \text{ and } n = \lfloor \log_2(N_{info} - 24) \rfloor - 5.$$

TBS may be determined based on a value of $$N'_{info}$$

and a pseudo-code of Equation 2 below. C below corresponds to the number of code blocks included in one TB.

if $R \le 1/4$      Equation 2

$$TBS - 8*C*\left\lceil \frac{N'_{info} + 24}{8*C} \right\rceil - 24, \text{ where } C - \left\lceil \frac{N'_{info} + 24}{3816} \right\rceil$$

else

> 8424

$$TBS = 8*C*\left\lceil \frac{N'_{info} + 24}{8*C} \right\rceil - 24, \text{ where } C = \left\lceil \frac{N'_{info} + 24}{8424} \right\rceil$$

else $$TBS = 8*\left\lceil \frac{N'_{info} + 24}{8} \right\rceil - 24$$

end if end if

[LBRM Scheme]

In the NR system, when one CB is input to an LDPC encoder, the CB may be output with parity bits added thereto. In this regard, an amount of parity bits may vary according to an LDCP base graph. With respect to a particular input, a method by which all parity bits generated by LDPC coding are transmitted may be referred to as full buffer rate matching (FBRM), and a method by which the number of transmittable parity bits is limited may be referred to as limited buffer rate matching (LBRM). When a resource is allocated for data transmission, an output of an LDPC encoder is generated as a circular buffer, and bits of the generated buffer are transmitted repeatedly as much as the allocated resource, and a length of the circular buffer may be $N_{cb}$.

When the number of all parity bits generated by LDPC coding is N, $N_{cb}=N$ in the FBRM scheme. In the LBRM, $N_{cb}=\min(N, N_{ref})$, $N_{ref}$ is given by $$N_{ref} = \left\lfloor \frac{TBS_{LBRM}}{C \cdot R_{LBRM}} \right\rfloor,$$

and $R_{LBRM}$ may be determined as $2/3$. In order to obtain $TBS_{LBRM}$, the aforementioned method of calculating TBS is used, whereas the calculation may be performed based on assumption of a maximum number of layers and a maximum modulation order which are supported by the UE in a corresponding cell. When MCS Table supporting 256 QAM is configured to be used for at least one BWP in a corresponding cell, a maximum modulation order $Q_m$ may be assumed to be 8, and may be assumed to be 6(64 QAM) when it is not configured, a code rate may be assumed to be 948/1024 that is a maximum code rate, $N_{RE}$ may be assumed to be $N_{RE}=156 \cdot n_{PRB}$, and $n_{PRB}$ may be assumed to be $n_{PRB,LBRM}$. $n_{PRB,LBRM}$ may be given in Table 11 below.

TABLE 11

| Maximum number of PRBs across all configured DL BWPs and UL BWPs of a carrier for DL-SCH and UL-SCH, respectively | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

[Maximum Data Rate]

In the NR system according to various embodiments of the disclosure, a maximum data rate supported by the UE may be determined by using Equation 3 below.

Equation 3 data rate (in Mbps) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot \left(1 - OH^{(j)}\right) \right)$$

In Equation 3 above, J may indicate the number of carriers grouped due to carrier aggregation (CA), Rmax=948/1024, $$v_{Layers}^{(j)}$$

may indicate a maximum number of layers, $$Q_m^{(j)}$$

may indicate a maximum modulation order, $f^{(j)}$ may indicate a scaling index, and $\mu$ may indicate a subcarrier spacing. The UE may report one value among 1, 0.8, 0.75, and 0.4 as $f^{(j)}$, and $\mu$ may be given in Table 12 below.

TABLE 12

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal |
| 3 | 120 | Normal, Extended |
| 4 | 240 | Normal |

Also, $$T_s^{\mu}$$

indicates an average OFDM symbol length, $$T_s^{\mu}$$

may be calculated by $$\frac{10^{-3}}{14 \cdot 2^{\mu}}, \text{ and } N_{PRB}^{BW(j),\mu}$$

indicates a maximum number of RBs in BW(j). $OH^{(j)}$ indicates an overhead value which may be given as 0.14 in a DL of FR1 (a band equal to or less than 6 GHz) and as 0.18 in an UL, and may be given as 0.08 in a DL of FR2 (a band greater than 6 GHz) and as 0.10 in an UL. A maximum data rate in a DL in a cell having a frequency bandwidth of 100 MHz in 30 kHz subcarrier spacing may be calculated as Table 13 below by using Equation 3.

TABLE 13

| $f^{(j)}$ | $v_{Layers}^{(j)}$ | $Q_m^{(j)}$ | Rmax | $N_{PRB}^{BW(j),\mu}$ | $T_s^{\mu}$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, an actual data rate of actual data transmission which can be measured by the UE may be a value obtained by dividing a data amount by a data transmission time. This may correspond to a value which is TBS in 1 TB transmission or a value which is obtained by dividing a sum of TBS by a transmission time interval (TTI) length in 2 TB transmission. For example, according to assumption with respect to calculation of Table 13, a maximum data rate in a DL in a cell having a frequency bandwidth of 100 MHz in 30 kHz subcarrier spacing may be determined according to the number of allocated PDSCH symbols, as in Table 14 below.

TABLE 14

| $N_{symb}^{sh}$ | $N_{DMRS}^{PRB}$ | $N_{RE}'$ | $N_{RE}$ | $N_{info}$ | n | $N_{info}'$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.70 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

A maximum data rate supported by the UE may be identified based on Table 13, and an actual data rate following allocated TBS may be identified via Table 14. Here, there may be a case where an actual data rate is greater than a maximum data rate according to scheduling information.

In a wireless communication system, in detail, the NR system, a data rate the UE can support may be defined between the BS and the UE. The data rate may be calculated by using a maximum frequency band, a maximum modulation order, a maximum number of layers, and the like which are supported by the UE. However, the calculated data rate may be different from a value calculated from a TBS of a TB and a length of a TTI which are used in actual data transmission.

Accordingly, the UE may be allocated a TBS being greater than a value corresponding to a data rate the UE supports, and in order to prevent this, there may be restriction of scheduling of TBS according to the data rate the UE supports.

FIG. 6 is a diagram illustrating that a synchronization signal (SS) and a PBCH in the NR system are mapped to frequency and time domains according to an embodiment of the disclosure. Referring to FIG. 6, a primary synchronization signal (PSS) 701, a secondary synchronization signal (SSS) 703, and a PBCH 705 are mapped to 4 OFDM symbols, and the PSS 701 and the SSS 703 are mapped to 12 RBs, and the PBCH 705 is mapped to 20 RBs. Table in FIG. 6 illustrates how a frequency band of 20 RBs is changed according to subcarrier spacings (SCSs). A resource region on which a PSS, an SSS, and a PBCH are transmitted may be referred to as an SS/PBCH block. Also, the SS/PBCH block may be referred to as an SSB block.

FIG. 7 is a diagram illustrating symbols on which an SS/PBCH block can be transmitted according to subcarrier spacings according to an embodiment of the disclosure.

Referring to FIG. 7, a subcarrier spacing may be configured as 15 kHz, 30 kHz, 120 kHz, 240 kHz, and the like, and a position of a symbol on which an SS/PBCH block (or an SSB block) can be located may be determined according to each subcarrier spacing. FIG. 7 illustrates positions of symbols on which an SSB block can be transmitted according to subcarrier spacings from among symbols within 1 ms. A position in which the SSB block is transmitted may be configured for the UE by system information or dedicated signaling.

In general, the UE is distant from the BS, and thus, a signal transmitted from the UE may be received by the BS after a propagation delay. The propagation delay refers to a value obtained by dividing, by a speed of light, a path on which a radio wave is delivered from the UE to the BS, and in general, the propagation delay may refer to a value obtained by dividing a distance between the UE and the BS by a speed of light. In an embodiment of the disclosure, in a case of a UE located at a place being distant by 100 km from the BS, a signal transmitted from the UE is received by the BS after 0.34 msec. In reverse, a signal transmitted from the BS is received by the UE after 0.34 msec. As described above, a time a signal transmitted from a UE reaches a BS may vary according to a distance between the UE and the BS. Therefore, when a plurality of UEs located at different places simultaneously transmit signals, a time the signals reach a BS may vary. In order to allow the signals transmitted from the plurality of UEs to simultaneously reach the BS by solving this problem, a time in which a UE transmits a UL signal may be different in each of the UEs according to positions. In the 5G, NR, and LTE systems, this is referred to as timing advance.

FIG. 8 is a diagram illustrating UE processing time according to timing advance when a UE receives a first signal and transmits a second signal in response thereto, in the 5G or NR system according to an embodiment of the disclosure.

Hereinafter, UE processing time according to timing advance will now be described in detail. Referring to FIG. 8, when a BS transmits UL scheduling grant (UL grant) or DL control signal and data (DL grant and DL data) to a UE in a slot n 902, the UE may receive the UL grant or the DL grant and the DL data in a slot n 904. Here, the UE may receive a signal after a propagation delay (Tp) 910, compared to a time when the BS transmitted the signal. In an embodiment of the disclosure, when the UE receives a first signal in the slot n 904, the UE transmits a second signal corresponding thereto in a slot n+4 906. When the UE transmits a signal to the BS, in order to make the signal arrive at the BS at a particular time, the UE may transmit HARQ ACK/NACK with respect to UL data or DL data on a timing 906 slot advanced by a timing advance (TA) 912 before a slot n+4 908, when a slot in which the UE received a reference signal is n. Therefore, in the embodiment of the disclosure, a time in which the UE can receive UL grant and transmit UL data or receive DL data and prepare to deliver HARQ ACK or NACK may be a time corresponding to 3 slots excluding a TA at operation 914.

In order to determine the aforementioned timing, the BS may calculate an absolute value of the TA of the UE. The BS may calculate the absolute value of the TA by adding or subtracting variation in a value of the TA, which is delivered by higher layer signaling, to or from a value of the TA which is first delivered to the UE in a random access procedure when the UE initially accesses. In the disclosure, the absolute value of the TA may correspond to a value obtained by subtracting a start time of an $n^{th}$ TTI the UE receives from a start time of an $n^{th}$ TTI the UE transmits.

One of important references of performance of a cellular wireless communication system is packet data latency. For this, in an LTE system, transmission and reception of a signal are performed in a unit of a subframe having a TTI of 1 ms. The LTE system operating in the afore-described manner may support a UE (a short-TTI UE) having a shorter TTI than 1 ms. In the 5G or NR system, a TTI may be shorter than 1 ms. The short-TTI UE is appropriate for a Voice over LTE (VoLTE) service or a service such as a remote control, for which latency is important. Also, the short-TTI UE may be an entity capable of implementing mission-critical IoT on a cellular communication base.

In the 5G or NR system according to an embodiment of the disclosure, when the BS transmits a PDSCH including DL data, DCI for scheduling the PDSCH may indicate a K1 value corresponding to timing information by which the UE transmits HARQ-ACK information about the PDSCH. In a case where it is not indicated that the HARQ-ACK information including a timing advance is to be transmitted earlier than a symbol L1, the HARQ-ACK information including a timing advance may be transmitted from the UE to the BS at a point of time equal to the symbol L1 or a point of time after the symbol L1. In a case where it is indicated that the HARQ-ACK information including a timing advance is to be transmitted earlier than the symbol L1, the HARQ-ACK information may not be valid HARQ-ACK information in HARQ-ACK transmission from the UE to the BS.

The symbol L1 may be a first symbol on which a cyclic prefix (CP) starts after $T_{proc,1}$ from a last point of time of the PDSCH. $T_{proc,1}$ may be calculated by using Equation 4 below.

$$T_{proc,1} = ((N_1 + d_{1,1} + d_{1,2})(2048 + 144) \cdot \kappa 2^{-\mu}) \cdot T_c \rfloor \qquad \text{Equation 4}$$

In Equation 4 described above, $N_1$, $d_{1,1}$, $d_{1,2}$, $\kappa$, $\mu$, and $T_C$ may be defined as below.

When HARQ-ACK information is transmitted via a PUCCH (a UL control channel), $d_{1,1}=0$, and when the HARQ-ACK information is transmitted via a PUSCH (a UL shared channel or data channel), $d_{1,1}=1$.

In a case where the UE is configured with a plurality of activated configuration carriers or carriers, a maximum timing difference between the carriers may be reflected on second signal transmission.

In a case of a PDSCH mapping type A, i.e., in a case where a first DMRS symbol position is a third or fourth symbol of a slot, when a position index i of a last symbol of a PDSCH is smaller than 7, it is defined that $d_{1,2}=7$-i.

In a case of a PDSCH mapping type B, i.e., in a case where a first DMRS symbol position is a first symbol of a PDSCH, when a length of the PDSCH is 4 symbols, $d_{1,2}=3$, and when a length of the PDSCH is 2 symbols, $d_{1,2}=3+d$, where d refers to the number of symbols over which a PDCCH including the PDSCH and a control signal for scheduling the PDSCH is overlapped.

$N_1$ is defined as in Table 15 below according to $\mu$. M=0, 1, 2, 3 respectively indicate subcarrier spacings of 15 kHz, 30 kHz, 60 kHz, 120 kHz.

TABLE 15

| | PDSCH decoding time $N_1$ [symbols] | |
| --- | --- | --- |
| $\mu$ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

A value of $N_1$ which is provided in Table 15 described above may be different values according to UE capabilities.

$$T_c = 1/(\Delta f_{max} \cdot N_f), \Delta f_{max} = 480 \cdot 10^3 \text{ Hz}, N_f = 4096, \kappa = T_s/T_c = 64,$$

$$T_s = 1/(\Delta f_{ref} \cdot N_{f,ref}), \Delta f_{ref} = 15 \cdot 10^3 \text{ Hz}, N_{f,ref} = 2048$$

Definitions are as above.

Also, in the 5G or NR system according to an embodiment of the disclosure, when the BS transmits control information including UL grant, the BS may indicate a K2 value corresponding to timing information by which the UE transmits UL data or a PUSCH.

In a case where it is not indicated that the PUSCH including a timing advance is to be transmitted earlier than a symbol L2, the PUSCH including a timing advance may be transmitted from the UE to the BS at a point of time equal to the symbol L2 or a point of time after a symbol L2. In a case where it is indicated that the PUSCH including a timing advance is to be transmitted earlier than the symbol L2, the UE may ignore UL grant control information from the BS.

The symbol L2 may be a first symbol on which a CP of a PUSCH symbol which has to be transmitted after $T_{proc,2}$ from a last point of time of a PDCCH including scheduling grant is started. $T_{proc,2}$ may be calculated by using Equation 5 below.

$$T_{proc,2} = ((N_2 + d_{2,1})(2048 + 144) \cdot \kappa 2^{-\mu}) \cdot T_c \qquad \text{Equation 5}$$

In Equation 5 described above, $N_2$, $d_{2,1}$, $\kappa$, $\mu$, and $T_C$ may be defined as below.

In a case where a first symbol among symbols allocated to a PUSCH includes only a DMRS, $d_{2,1}=0$, and except for the case, $d_{2,1}=1$.

In a case where the UE is configured with a plurality of activated configuration carriers or carriers, a maximum timing difference between the carriers may be reflected on second signal transmission.

$N_2$ is defined as in Table 16 below according to $\mu$. M=0, 1, 2, 3 respectively indicate subcarrier spacings of 15 kHz, 30 kHz, 60 kHz, 120 kHz.

TABLE 16

| $\mu$ | PUSCH preparation time $N_2$ [symbols] |
| --- | --- |
| 0 | 10 |
| 1 | 12 |
| 2 | 23 |
| 3 | 36 |

A value of $N_2$ which is provided in Table 16 described above may be different values according to UE capabilities.

$$T_c = 1/(\Delta f_{max} \cdot N_f), \Delta f_{max} = 480 \cdot 10^3 \text{ Hz}, N_f = 4096, \kappa = T_s/T_c = 64,$$

$$T_s = 1/(\Delta f_{ref} \cdot N_{f,ref}), \Delta f_{ref} = 15 \cdot 10^3 \text{ Hz}, N_{f,ref} = 2048$$

Definitions are as above.

[Bandwidth Part (BWP)]

The 5G or NR system according to an embodiment of the disclosure may configure a BWP within one carrier so as to allow a particular UE to perform transmission and reception within the configured BWP. This may be performed to reduce power consumption of the UE. The BS may configure a plurality of BWPs, and may change an activated BWP in control information. A period of time allowed for the UE to switch a BWP may be defined as in Table 17 below.

TABLE 17

| Frequency Range | Scenario | Type 1 Delay (μs) | Type 2 Delay (μs) |
| --- | --- | --- | --- |
| 1 | 1 | 600 | 2000 |
| | 2 | 600 | 2000 |
| | 3 | 600 | 2000 |
| | 4 | 400 | 950 |
| 2 | 1 | 600 | 2000 |
| | 2 | 600 | 2000 |
| | 3 | 600 | 2000 |
| | 4 | 400 | 950 |

In Table 17, the frequency range 1 refers to a frequency band equal to or less than 6 GHz, and the frequency range 2 refers to a frequency band greater than 6 GHz. In the afore-described embodiment of the disclosure, Type 1 and Type 2 may be determined according to UE capabilities. In the afore-described embodiment of the disclosure, scenarios 1, 2, 3, and 4 may be given as in Table 18.

TABLE 18

| | Change in primary frequency | No change in primary frequency |
|---|---|---|
| Change in frequency bandwidth | Scenario 3 | Scenario 2 |
| No change in frequency bandwidth | Scenario 1 | Scenario 4 when subcarrier spacing is changed |

FIG. 9 is a diagram illustrating an example in which a BS schedules a plurality of pieces of data (e.g., TBs) according to slots and transmits the data, receives HARQ-ACK feedback with respect to the data, and performs retransmission, in response to the feedback according to an embodiment of the disclosure. Referring to FIG. 9, TB1 is initially transmitted in slot 0, and ACK/NACK feedback in response thereto is transmitted in slot 4. If initial transmission of TB1 is failed and NACK is received, retransmission of TB1 may be performed in slot 8. A time when ACK/NACK feedback is transmitted and a time when retransmission is performed may be predetermined, or may be determined according to control information and/or a value indicated by higher layer signaling. FIG. 9 illustrates the example in which TB1 to TB8 are sequentially scheduled to slots starting from slot 0 and are transmitted. This may correspond to, for example, a case where HARQ process IDs 0 to 7 are respectively allocated to TB1 to TB8 and TB1 to TB8 are transmitted. If the number of HARQ process IDs the BS and the UE can use is only 4, sequential transmission of 8 different TBs may not be performed.

[Groupcast/Multicast]

FIG. 10 is a diagram illustrating an example of groupcast in which same control information and data are transmitted from a BS 1101 to a plurality of UEs according to an embodiment of the disclosure.

Referring to FIG. 10, the BS 1101 may inform, via SIB or preset information, a plurality of UEs 1103, 1105, 1107, and 1111 of G1-RNTI for receiving groupcast control information, and the UEs 1103, 1105, 1107, and 1111 may receive the groupcast control information by using the G1-RNTI. The G1-RNTI may be scrambled to a CRC of the groupcast control information (DCI) and transmitted. In FIG. 10, a UE 1109 may be a UE that accesses the BS 1101 and is allocated a C-RNTI from the BS 1101. Also, the UE 1111 may be a UE that accesses the BS 1101 and may also be the UE that is allocated a C-RNTI from the BS 1101 and knows a G1-RNTI for groupcast. As described above, in a case where same control information and data are transmitted, and one or more UEs can receive the transmitted control information and data, the case may be referred to as groupcast. Also, as in FIG. 10, in a case where particular UEs such as the UE 1109 and the UE 1111 are allocated a UE-specific RNTI value and only the particular UEs can receive control information and data by using the RNTI value, the case may be referred to as unicast.

A UE may be configured to receive a control channel and a data channel for groupcast from a transmitter A and to receive a control channel and a data channel for unicast from a transmitter B. In a current embodiment of the disclosure, the transmitter A and the transmitter B may be a same transmitter or different transmitters. In the disclosure, the transmitter A and the transmitter B may be BSs or may be vehicles or normal UEs. A case where a transmitter is a BS may correspond to a case where groupcast and unicast data transmissions are delivered from the BS, i.e., are delivered via a Uu link. In a case where the transmitter is a vehicle or a normal UE, groupcast and unicast transmissions may be sidelink transmissions. Here, the transmitter is a UE referred to as a leader node or an anchor node in a group, and may perform groupcast transmission to a different UE in the group and may receive control information from the different UE. Also, an embodiment of the disclosure may be modified as if the transmitter A is a vehicle and the transmitter B is a BS and may be applied. The embodiment of the disclosure is described assuming that the transmitter A and the transmitter B are one transmitter, but the embodiment of the disclosure may be modified and applied to a case in which they are different transmitters.

In order to receive control channels and data channels for groupcast/broadcast/multicast, a UE may be configured with an RNTI value (hereinafter, interchangeably used with an RNTI (a group RNTI, a G-RNTI) or a group-common RNTI, a group identifier, or a multicast and broadcast services (MBS) RNTI) corresponding to a unique ID or may receive the RNTI value from a BS or a different UE (this may be a leader node) in a group. The UE may receive a control channel for groupcast by using the G-RNTI value, and may receive a data channel, based on the control channel In the embodiment of the disclosure, a control channel for data scheduling may be interchangeably used with a PDCCH or a physical sidelink control channel (PSCCH), a data channel may be interchangeably used with a PDSCH or a physical sidelink shared channel (PSSCH), and a feedback channel may be interchangeably used with a PUCCH or a PSCCH. Also, control information for scheduling which is to be received by a UE may be described as DCI but may be differently referred.

That is, for example, data for groupcast and control information for scheduling the data for groupcast may be transmitted by using a G-RNTI. In an embodiment of the disclosure, a G-RNTI value or a partial value may be scrambled to a CRC of control information (DC) and channel coding may be applied thereto. The RNTI may be different from a UE-specific RNTI for transmission of data for unicast, and may be configured for a plurality of UEs. A format of the DCI may be different from a format of DCI for scheduling data for unicast.

In the disclosure, a case where one UE transmits data to a plurality of UEs or a case where a BS transmits same data to a plurality of UEs may be referred to as groupcast or multicast, and the groupcast and the multicast may be interchangeably used. Also, in the disclosure, data may indicate a transport block delivered on a shared channel such as a PDSCH, a PUSCH, a PSSCH, and the like. Groupcast or MBS may be supported in consideration of FBRM in a DL or a sidelink of the 5G NR system. However, types of UEs that receive groupcast or MBS may be vary various, and thus, some UEs not having a sufficient buffer therein may have difficulty in operating a soft buffer or may experience performance deterioration. Therefore, in a case where some groupcast or multicast services or a broadcast service (hereinafter, referred to as MBS for convenience) are provided, LBRM may be applied to stably provide a service to a plurality of various UEs.

The disclosure provides an LBRM scheme appropriate for MBS in a DL or a sidelink.

First, a PDSCH LBRM scheme in the current 5G NR is as described in [Legacy rate matching configuration based on PDSCH-LBRM] below. However, definitions of primary parameters and referred Table numbers of [Legacy rate matching configuration based on PDSCH-LBRM] conform to the 3GPP standard rules of TS 38.212.

[Legacy Rate Matching Configuration Based on PDSCH-LBRM]

The bit sequence after encoding $d_0, d_1, \ldots, d_{N-1}$ from Clause 5.3.2 is written into a circular buffer of length $N_{cb}$ for the r-th coded block, where N is defined in Clause 5.3.2.

For the r-th code block, let $N_{cb}=N$ if $I_{LBRM}=0$ and $N_{cb}=\min(N,N_{ref})$ otherwise, where $$N_{ref} = \left\lfloor \frac{TBS_{LBRM}}{C \cdot R_{LBRM}} \right\rfloor,$$

$R_{LBRM}=2/3$, $TBS_{LBRM}$ is determined according to Clause 5.1.3.2 in [TS 38.214] for DL-SCH/PCH, assuming the following:

maximum number of layers for one TB for DL-SCH/PCH is given by the minimum of X and 4, where if the higher layer parameter maxMIMO-Layers of PDSCH-ServingCellConfig of the serving cell is configured, X is given by that parameter otherwise, X is given by the maximum number of layers for PDSCH supported by the UE for the serving cell if the higher layer parameter mcs-Table given by a pdsch-Config for at least one DL BWP of the serving cell is set to 'qam256', maximum modulation order $Q_m=8$ is assumed for DL-SCH; otherwise a maximum modulation order $Q_m=6$ is assumed for DL-SCH;

maximum coding rate of 948/1024;

$n_{PRB}=n_{PRB,LBRM}$ is given by Table 5.4.2.1-1, where the value of $n_{PRB,LBRM}$ for DL-SCH is determined according to the initial downlink bandwidth part if there is no other downlink bandwidth part configured to the UE;

$N_{RE}=156 \cdot n_{PRB}$;

C is the number of code blocks of the transport block determined according to Clause 5.2.2.

TABLE 19

Value of $n_{PRB,LBRM}$

| Maximum number of PRBs across all configured DL BWPs and UL BWPs of a carrier for DL-SCH and UL-SCH, respectively | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

According to [Legacy rate matching configuration based on PDSCH-LBRM] above, in order to identify or determine TBSLBRM in a case where LBRM is applied, a maximum number of layers for one TB may be determined, based on parameter maxMIMO-Layers included in PDSCH-Serving-CellConfig of higher layer signaling or a maximum number of layers with respect to a PDSCH which are supported by a UE. Here, a value thereof may not exceed 4. Also, a modulation order may be determined based on parameter mcs-Table included in pdsch-Config of higher layer signaling or a predetermined value (e.g., 6). The method may be appropriate for a case where LBRM is applied to a particular UE but may not be appropriate for a case where LBRM is applied to a plurality of UEs, in consideration of a service such as MBS.

FIG. 11 is a diagram illustrating an example in which BWPs are configured in a UL and a DL according to an embodiment of the disclosure.

Referring to FIG. 11, a separate BWP may be configured for an MBS service, or alternatively, a special frequency resource may be configured for MBS in a BWP separately configured for a UE. A BWP for a DL and a UL for MBS may be configured via SIB, or alternatively, may be configured via UE-specific RRC signaling.

In an embodiment of the disclosure, the UE may receive, for DL transmission, DL data (PDSCH) and a control channel (PDCCH) in an initial BWP, a UE-specific configured BWP, or a BWP configured for MBS, and may transmit a UL feedback, in response thereto, in an initial BWP, a UE-specific configured BWP, or a BWP configured for MBS via a PUCCH or a PUSCH.

The disclosure provides a method by which, when an MBS service is provided to a UE, the UE uses a UL BWP configured for MBS or a UE-specific configured BWP so as to transmit feedback with respect to DL data or UL control information (UCI) to a BS.

First Embodiment

The first embodiment of the disclosure provides a method and a UE by which the UE selects a BWP for transmitting UCI.

FIG. 12 is a diagram illustrating an example of a UL BWP configured for a UE1, a UL BWP configured for a UE2, and a UL BWP for MBS commonly configured for two UEs according to an embodiment of the disclosure.

Referring to FIG. 12, in the example, the BWP for MBS is included in a frequency domain of a BWP of UE2 but is not included in a frequency domain of a BWP of UE1. In an embodiment of the disclosure, each UE may use a UE-specific BWP configured for itself or use a BWP configured for MBS so as to transmit, via a UL, HARQ-ACK feedback information with respect to a PDCCH or a PDSCH transmitted via a DL.

The BWP in which the HARQ-ACK feedback information is to be transmitted may be determined according to a priority. In an embodiment of the disclosure, when a BWP for MBS is configured, HARQ-ACK feedback may be transmitted by using a PUCCH by using the BWP for MBS, and when the BWP for MBS is not configured, the HARQ-ACK feedback may be transmitted by using a PUCCH or a PUSCH by using a UE-specific configured BWP. In another embodiment of the disclosure, in a case where a PUSCH is transmitted in a UE-specific BWP when HARQ-ACK feedback with respect to DL transmission for MBS is transmitted, even if a BWP for MBS is configured, the HARQ-ACK feedback may be transmitted by using the PUSCH transmitted in the UE-specific BWP. In another embodiment of the disclosure, a BS may configure a UE as to in which UL BWP HARQ-ACK feedback information is to be transmitted, by a particular bit field of DL DCI or a combination of bit field values.

If all BWPs configured for a UE for MBS are not included within a frequency range of a UE-specific configured UL BWP that is currently activated, the UE may require a certain period of time to switch the activated BWP so as to transmit HARQ-ACK feedback information in a BWP for MBS. Therefore, in a case where all BWPs configured for the UE for MBS are not included within the frequency range of the UE-specific configured UL BWP that is currently activated, when a point of time the HARQ-ACK feedback information has to be transmitted in the BWP for MBS is earlier than a predetermined time, that is, in a case where a processing time of a certain value or more is not given to the UE, feedback may not be transmitted in the BWP for MBS. In this case, transmission of the feedback may not be performed in the BWP for MBS, and instead, the UE may transmit HARQ-ACK feedback for MBS in the UL BWP that is currently activated.

Second Embodiment

The second embodiment of the disclosure provides a method and a UE by which the UE transmits UCI in a BWP configured for MBS and a BS receives it.

In a case where the UE transmits HARQ-ACK feedback in a BWP configured for MBS, the UE needs to select a frequency and time resource to which a PUCCH is mapped. The PUCCH resource may be commonly used by UEs or different PUCCH resources may be used by UEs to transmit feedback. The PUCCH resource may be determined based on one of methods below or a combination of at least two of the methods.

Method 1: A method of using a particular bit field value of DCI. For example, the PUCCH resource may be determined according to DCI indicating whether only NACK is transmitted or whether it is ACK or NACK is transmitted via a PUCCH.

Method 2: A method of using a C-RNTI value. This may involve using some bits of a C-RNTI, and for example, may use 1 bit or 2 bits of an LSB. Alternatively, on the contrary thereto, 2 bits of an MSB of the C-RNTI may be used.

Method 3: A method of using a frame number, a slot index, and the like. The frame number or the slot index may be a frame number or a slot index in a point of time a PUCCH is to be transmitted, or alternatively, may be a frame number or a slot index in a point of time a PDSCH corresponding to HARQ-ACK is transmitted.

Method 4: A method of using whether a BWP for MBS is configured.

Method 5: A method of using a frequency domain of a UE-specific BWP which is currently activated or initial BWP, and a frequency domain of a BWP for MBS.

Method 6: A method of using a period of time required for a UE to perform BWP switching and a point of time a PDSCH is transmitted and a point of time a PUCCH is transmitted.

Method 7: A method of using an offset value configured by higher layer signaling (MAC CE or RRC signaling)

Method 8: A method of using an offset value transmitted via group-common DCI

Method 9: A method of using Cell ID

FIG. 13 is a diagram illustrating an example of a position of a PUCCH resource in a BWP configured for MBS.

For example, the PUCCH resource may be determined according to Equations 6 or 7 below.

$$(N_{ID}) \bmod \left( \left\lceil \frac{N_{PUCCH, resource}^{PRB}}{N_{PUCCH}^{PRB} \times N_{PUCCH}^{symbol}} \right\rceil \right) \qquad \text{Equation 6}$$

$$(N_{ID}) \bmod (N_{PUCCH}^{resource}) \qquad \text{Equation 7}$$

In Equations 6 and 7, NID may indicate a group member index or may be a value determined by a C-RNTI or the like. The group member index may be a value configured for or indicated to a UE.

$$N_{PUCCH}^{resource}$$

may indicate the number of PUCCH resources configured in a MBS BWP.

$$N_{PUCCH, resource}^{PRB}$$

may indicate a PRB to which a PUCCH is mapped, and $$N_{PUCCH}^{PRB}$$

and $$N_{PUCCH}^{symbol}$$

may respectively indicate the number of PRBs and the number of symbols, on which a PUCCH can be transmitted.

The parameter configuring and determining methods based on LBRM provided in various embodiments of the disclosure may perform decoding only when a BS and a UE or a transmitter and a receiver all maintain same configuration or predefined configuration. Also, new configuring and determining methods can be derived from various combinations of the parameter configuring and determining methods described in the embodiments of the disclosure.

Transmitters, receivers, and processors of a UE and a BS for performing various embodiments of the disclosure are respectively shown in FIGS. 14 and 15. In various embodiments of the disclosure, a transmitting and receiving method, performed by the UE or the BS, for transmitting groupcast and unicast control information and data is described, and in order to perform the method, the receivers, the processors, and the transmitters of the BS and the UE have to operate according to each of the embodiments of the disclosure. In a case where an embodiment of the disclosure is applied to data transmission and reception in a sidelink, a BS in operations below may be a UE or a legacy BS which performs transmission in the sidelink. A UE in operations below may be a UE that performs transmission or reception in a sidelink.

In detail, FIG. 14 is a block diagram illustrating an internal structure of a UE according to an embodiment of the disclosure. As shown in FIG. 14, the UE according to an embodiment of the disclosure may include a UE receiver 1600, a UE transmitter 1604, and a UE processor 1602. The UE receiver 1600 and the UE transmitter 1604 may be collectively referred to as a transceiver in an embodiment of the disclosure. The transceiver may transmit or receive a signal to or from a BS. The signal may include control information and data. To this end, the transceiver may include a RF transmitter for up-converting and amplifying a frequency of signals to be transmitted, and an RF receiver for low-noise-amplifying and down-converting a frequency of received signals. Also, the transceiver may receive signals through wireless channels and output the signals to the UE processor 1602, and may transmit signals output from the UE processor 1602, through wireless channels. The UE processor 1602 may include a controller for controlling a series of processes to allow the UE to operate according to various embodiments of the disclosure.

The afore-described controller for controlling operations of the UE according to various embodiments of the disclosure may perform operations below.

In a communication system or a broadcasting system, the UE (or a terminal) may receive a signal corresponding to data transmitted from a transmitter or a BS and then may appropriately decode the signal based on a channel coding scheme after an appropriate demodulating procedure. In order to perform decoding, the UE has to determine an exactly same rate matching scheme performed by the transmitter or the BS. Therefore, the UE may identify whether LBRM is applied, based on an instruction with respect to LBRM. Here, because parameter configuration for an LBRM operation may vary according to whether it is unicast (or data transmission to one UE) or multicast/groupcast (or data transmission to a plurality of UEs), an operation of identifying whether it is unicast transmission or multicast/groupcast transmission may be added. Also, the UE may determine or identify whether it is unicast or multicast/groupcast, by separate higher layer signaling or based on a separate indicator transmitted from the BS. In a case where the UE has to perform an operation corresponding to LBRM performed by a transmitter in a unicast (or data transmission to one UE) situation, the UE may perform the operation corresponding to LBRM performed by the transmitter, based on a first configuration, and in a case where the UE has to perform the operation corresponding to LBRM performed by the transmitter in a multicast/groupcast (or data transmission to a plurality of UEs) situation, the UE may perform the operation corresponding to LBRM performed by the transmitter, based on a second configuration. Here, at least one of parameters corresponding to the first configuration may be different from parameters corresponding to the second configuration, or at least one of values of the parameters corresponding to the first configuration may be different from values of the parameters corresponding to the second configuration. Detailed schemes with respect to the first configuration and the second configuration may be determined based on the first embodiment, the second embodiment, or an appropriate combination of operations of each embodiment.

The operation that is performed by a receiver (e.g., the UE) and corresponds to LBRM of the transmitter (e.g., the BS) may be referred to as an LBRM operation, for convenience. In other words, the LBRM operation by the receiver may indicate an operation corresponding to LBRM of the transmitter. Also, an LBRM operation performed by the BS is an operation performed with respect to a bit level, but the operation that is performed by the receiver and corresponds to LBRM performed by the transmitter may be performed, in correspondence to values corresponding to a reception signal generated or determined based on demodulation. For example, when likelihood ratio (LR) or log-likelihood ratio (LLR) values corresponding to respective transmitted bits are determined based on the reception signal through demodulation, the LBRM operation of the receiver may be performed based on the LR or LLR values with respect to the respective bits or other message values corresponding thereto. Therefore, after LBRM is performed by the receiver, transmitted data may be determined or reconstructed by performing decoding of channel coding, based on values (e.g., LR or LLR) corresponding to a bit sequence which is determinable or identifiable based on the LBRM and is transmitted from the transmitter.

FIG. 15 is a block diagram illustrating an internal structure of a BS according to an embodiment of the disclosure. Referring to FIG. 15, the BS according to an embodiment of the disclosure may include a BS receiver 1701, a BS transmitter 1705, and a BS processor 1703. The BS receiver 1701 and the BS transmitter 1705 may be collectively referred to as a transceiver in an embodiment of the disclosure. The transceiver may transmit or receive a signal to or from a UE. The signal may include control information and data. To this end, the transceiver may include a RF transmitter for up-converting and amplifying a frequency of signals to be transmitted, and an RF receiver for low-noise-amplifying and down-converting a frequency of received signals. Also, the transceiver may receive signals through wireless channels and output the signals to the BS processor 1703, and may transmit signals output from the BS processor 1703, through wireless channels. The BS processor 1703 may include a controller for controlling a series of processes to allow the BS to operate according to various embodiments of the disclosure.

The afore-described controller for controlling operations of the BS according to various embodiments of the disclosure may perform operations below.

In a communication system or a broadcasting system, the BS may first appropriately perform encoding on data to be transmitted, based on a channel coding scheme. Then, the BS may determine whether to perform LBRM on the encoded data. Here, because parameter configuration for an LBRM operation may vary according to whether it is unicast (or data transmission to one UE) or multicast/groupcast (or data transmission to a plurality of UEs), an operation of identifying whether it is unicast transmission or multicast/groupcast transmission may be added. Also, the BS may indicate the UE as to whether it is unicast or multicast/groupcast, by separate higher layer signaling or an indicator. In a case where the BS has to perform LBRM in a unicast (or data transmission to one UE) situation, the BS may perform the LBRM based on a first configuration, and in a case where the BS has to perform LBRM in a multicast/groupcast (or data transmission to a plurality of UEs) situation, the BS may perform the LBRM based on a second configuration. Here, at least one of parameters corresponding to the first configuration may be different from parameters corresponding to the second configuration, or at least one of values of the parameters corresponding to the first configuration may be different from values of the parameters corresponding to the second configuration. Detailed schemes with respect to the first configuration and the second configuration may be determined based on the first embodiment, the second embodiment, or an appropriate combination of operations of each embodiment. After LBRM is performed, the BS may transmit, to the UE (or a terminal), a bit sequence by applying appropriate modulation thereto, the bit sequence being determinable or identifiable based on the LBRM.

While the disclosure has been shown and described with reference to various embodiments thereof, it will be understood by those skilled in the art that various changes and form and details may be made therein without departing from the spirit and scope of the disclosure as defined by the appended claims and their equivalents. Also, the embodiments may be combined to be implemented, when required. For example, the first embodiment and the second embodiment may be combined and applied. Also, other modifications based on the technical concept of the embodiments of the disclosure may be applied to the LTE system, the 5G system, or the like.

What is claimed is:

1. A method for a multicast and broadcast service (MBS) performed by a terminal in a wireless communication system, the method comprising:

receiving, from a base station, configuration information associated with a MBS resource within a downlink bandwidth part (BWP) for a physical downlink control channel (PDCCH) and a physical downlink shared channel (PDSCH) receptions via a system information block (SIB), and a downlink control information (DCI) associated with a hybrid automatic repeat request acknowledgment (HARQ-ACK) for the PDSCH;

receiving, from the base station, the PDCCH and the PDSCH based on the configuration information associated with the MBS resource; and transmitting a physical uplink control channel (PUCCH) associated with the HARQ-ACK for the PDSCH on an uplink BWP, based on the DCI, wherein, in case that an uplink BWP configured for an MBS is configured by the configuration information associated with the MBS resource, the uplink BWP is determined between a user equipment (UE) specific uplink BWP and the uplink BWP configured for the MBS based on a bit field of the DCI indicating whether only NACK or ACK/NACK is transmitted via the PUCCH, and wherein, in case that the uplink BWP configured for the MBS is not configured by the configuration information associated with the MBS resource, the uplink BWP is determined as the UE specific uplink BWP.

2. The method of claim 1, wherein the PDCCH and the PDSCH are received in the BWP associated with the multicast.

3. The method of claim 1, wherein the configuration information associated with the MBS resource comprises a BWP configured for the MBS, and wherein the PDCCH and the PDSCH are received in the BWP configured for the MBS.

4. The method of claim 1, further comprising:

receiving, from the base station, configuration information associated with an initial BWP of the terminal; and receiving, from the base station, the PDCCH and the PDSCH based on the configuration information associated with the initial BWP of the terminal.

5. The method of claim 1, further comprising:

receiving configuration information for the HARQ-ACK for the PDSCH; and determining the priority for the PUCCH associated with the HARQ-ACK for the PDSCH based on the configuration information for the HARQ-ACK for the PDSCH.

6. A method for a multicast and broadcast service (MBS) performed by a base station in a wireless communication system, the method comprising:

transmitting, to a terminal, configuration information associated with a MBS resource within a downlink bandwidth part (BWP) for a physical downlink control channel (PDCCH) and a physical downlink shared channel (PDSCH) receptions via a system information block (SIB), and a downlink control information (DCI) associated with a hybrid automatic repeat request acknowledgment (HARQ-ACK) for the PDSCH;

transmitting, to the terminal, the PDCCH and the PDSCH based on the configuration information associated with the MBS resource; and receiving a physical uplink control channel (PUCCH) associated with the HARQ-ACK for the PDSCH on an uplink BWP, based on the DCI, wherein, in case that an uplink BWP configured for an MBS is configured by the configuration information associated with the MBS resource, the uplink BWP is determined between a user equipment (UE) specific uplink BWP and the uplink BWP configured for the MBS based on a bit field of the DCI indicating whether only NACK or ACK/NACK is transmitted via the PUCCH, and wherein, in case that the uplink BWP configured for the MBS is not configured by the configuration information associated with the MBS resource, the uplink BWP is determined as the UE specific uplink BWP.

7. The method of claim 6, wherein the PDCCH and the PDSCH are transmitted in the BWP associated with the multicast.

8. The method of claim 6, wherein the configuration information associated with the MBS resource comprises a BWP configured for the MBS, and wherein the PDCCH and the PDSCH are transmitted in the BWP configured for the MBS.

9. The method of claim 6, further comprising:

transmitting, to the terminal, configuration information associated with an initial BWP of the terminal; and transmitting, to the terminal, the PDCCH and the PDSCH based on the configuration information associated with the initial BWP of the terminal.

10. A terminal for a multicast and broadcast service (MBS) of a wireless communication system, the terminal comprising:

a transceiver; and at least one processor configured to:

receive, from a base station, configuration information associated with a MBS resource within a downlink bandwidth part (BWP) for a physical downlink control channel (PDCCH) and a physical downlink shared channel (PDSCH) receptions via a system information block (SIB), and a downlink control information (DCI) associated with a hybrid automatic repeat request acknowledgment (HARQ-ACK) for the PDSCH, receive, from the base station, the PDCCH and the PDSCH based on the configuration information associated with the MBS resource, and transmit a physical uplink control channel (PUCCH) associated with the HARQ-ACK for the PDSCH on an uplink BWP, based on the DCI, wherein, in case that an uplink BWP configured for an MBS is configured by the configuration information associated with the MBS resource, the uplink BWP is determined between a user equipment (UE) specific uplink BWP and the uplink BWP configured for a MBS based on a bit field of the DCI indicating whether only NACK or ACK/NACK is transmitted via the PUCCH, and wherein, in case that the uplink BWP configured for the MBS is not configured by the configuration information associated with the MBS resource, the uplink BWP is determined as the UE specific uplink BWP.

11. The terminal of claim 10,
wherein the PDCCH and the PDSCH are received in the BWP associated with the multicast.

12. The terminal of claim 10,
wherein the configuration information associated with the MBS resource comprises a BWP configured for the MBS, and
wherein the PDCCH and the PDSCH are received in the BWP configured for the MBS.

13. The terminal of claim 10, wherein the at least one processor is further configured to:
receive, from the base station, configuration information associated with an initial BWP of the terminal, and
receive, from the base station, the PDCCH and the PDSCH based on the configuration information associated with the initial BWP of the terminal.

14. The terminal of claim 10, wherein the at least one processor is further configured to:
receive configuration information for the HARQ-ACK for the PDSCH, and
determine the priority for the PUCCH) associated with the HARQ-ACK for the PDSCH based on the configuration information for the HARQ-ACK for the PDSCH.

* * * * *